(12) United States Patent
Watanabe

(10) Patent No.: US 6,741,367 B1
(45) Date of Patent: May 25, 2004

(54) IMAGE FORMING APPARATUS HAVING DATA COMPRESSION/DECOMPRESSION SYSTEM

(75) Inventor: Takeo Watanabe, Musashimurayama (JP)

(73) Assignees: Casio Computer Co., Ltd., Tokyo (JP); Casio Electronics Manufacturing Co., Ltd., Iruma (JP)

( * ) Notice: Subject to any disclaimer, the term of this patent is extended or adjusted under 35 U.S.C. 154(b) by 0 days.

(21) Appl. No.: 09/536,909

(22) Filed: Mar. 28, 2000

(30) Foreign Application Priority Data

Apr. 1, 1999 (JP) .............................. 11-094669

(51) Int. Cl.[7] .............................. G06F 3/12; G06F 13/00
(52) U.S. Cl. ...................................... 358/1.15; 358/1.14
(58) Field of Search .............................. 358/1.15, 1.14, 358/1.9, 1.6, 1.13, 1.16, 1.17, 501, 523, 401, 403, 404, 426.03; 382/173, 176

(56) References Cited

U.S. PATENT DOCUMENTS 5,936,616 A * 8/1999 Torborg et al. ............. 345/202
6,549,657 B2 * 4/2003 Ohta et al. .................. 382/173

FOREIGN PATENT DOCUMENTS

EP      0 465 943      1/1992
EP      0 843 279      5/1998

* cited by examiner

Primary Examiner—Gabriel Garcia
Assistant Examiner—Douglas Tran
(74) Attorney, Agent, or Firm—Frishauf, Holtz, Goodman & Chick, P.C.

(57) ABSTRACT

A PC supplies previously compressed print data to a printer. In the printer, image data are generated based on the supplied print data, and the generated image data are developed in an image memory. Since the print data are compressed, a compressor/decompressor decompresses the print data. If available free area in the image memory is insufficient for developing the image data, the compressor/decompressor compresses the image data previously stored in the image memory, and the image memory is refreshed with the compressed image data. The compressed image data are decompressed by the compressor/decompressor before output to a printer engine. The compressor/decompressor is available for decompressing the print data during a period since the data reception from the PC until a sheet of paper onto which an image is formed reaches a predetermined position. When the sheet of the paper reaches the predetermined position, the compressor/decompressor is switched to decompress only the image data in the image memory.

15 Claims, 19 Drawing Sheets

40 → DATA FLOW (COMPRESSION-BY-HARDWARE)

41 ---→ DATA FLOW (DECOMPRESSION-BY-HARDWARE)

42 —·—→ DATA FLOW (COMPRESSION-BY-SOFTWARE)

43 —··—→ DATA FLOW (DIRECT DATA TRANSFER)

IMAGE FORMING APPARATUS HAVING DATA COMPRESSION/DECOMPRESSION SYSTEM

BACKGROUND OF THE INVENTION

1. Field of the Invention

The present invention relates to efficient management of a data compression/decompression system employed in an image forming apparatus such as a printer.

2. Description of the Related Art

Usually, a printer receives print data (including control data and image data) from a connected host computer, and generates image data representing an image to be printed on paper. The generated image data are developed in an image memory of the printer. Upon a printer engine in the printer receives the developed image data, the printer engine forms the image on the paper. In this specification, the image data included in the print data supplied by the host computer to the printer is referred to as "print data", and image data to be output to the printer engine is referred to as "image data".

In such the printer, the image data previously developed in the image memory are compressed, and then the image memory is refreshed with the compressed data, if the free area in the image memory is too small to accept newly arrived print data. After preparing sufficient free area, image data are generated based on received print data, and the generated image data are developed in the prepared free area. Or, the generated image data are stored in the free area after compressing. The compressed image data in the image memory will be decompressed by a compressor/decompressor before supplied to the printer engine.

Such the compression/decompression processing is frequently carried out in the printer for canceling the capacity shortage of the image memory. Through the processing, the highest priority is given to decompression of image data in the image memory to be output to the printer engine, in order to avoid delay in forming images on the paper. Under this condition, if several requests for compression/decompression processing are given, the compressor/decompressor is often occupied in decompressing the image data developed in the image memory.

The host computer usually supplies compressed print data to the printer. A CPU of the printer executes a program for decompressing such the compressed print data, in order to frequently supply the image data to the printer engine. In this structure, since the print data decompression requires relatively a long time period, process time of the printer as a whole is also elongated.

SUMMARY OF THE INVENTION

It is an object of the present invention to reduce process time for printing with efficient data compression/decompression in an image forming apparatus such as a printer.

To accomplish the above object, an image forming apparatus according to a first aspect of the present invention is an image forming apparatus having an image forming mechanism for forming an image represented by data supplied from a host device on a record medium, the image forming apparatus comprises:

a compressor/decompressor which compresses and decompresses data;

a buffer, connected to the compressor/decompressor by a signal line, which stores compressed original data given by a host device in order to generate image data;

an image memory, connected to the compressor/decompressor and the buffer by signal lines, which stores image data or compressed image data to be output;

a transfer circuit which outputs the image data or decompressed image data in the image memory via a first way formed by a signal line which connects the transfer circuit directly to the image memory or via a second way formed by a signal line which connects the transfer circuit to the image memory via the compressor/decompressor;

an image forming mechanism which forms an image corresponding to image data supplied by the transfer circuit on a record medium; and a processor which executes a predetermined program to control data compression/decompression by the compressor/decompressor and data transfer among the compressor/decompressor, the buffer, the image memory, and the transfer circuit, wherein the processor switches the compressor/decompressor to decompress the compressed image data in the image memory or to decompress the compressed original data in the buffer.

In the above image forming apparatus, the processor may discriminate whether a present period is a period for transferring the image data or the compressed image data in the image memory to the image forming mechanism via the transfer circuit, and may control the compressor/decompressor to decompress the original data in the buffer when the processor discriminates that the present period is not the period for transferring the image data or the compressed image data to the image forming mechanism.

In this case, the processor may execute a predetermined program to decompress the original data in the buffer when the processor discriminates that the present period is the period for transferring the image data or the compressed image data to the image forming mechanism.

According to the above described image forming apparatus, the original data supplied by the host device are decompressed by the hardware component (compressor/decompressor). This structure realizes reduction of process time for data compression/decompression, thus, process time for whole printing operation will be reduced.

In the above image forming apparatus, the processor may further control compression of uncompressed image data in the image memory.

In this case, the processor may discriminate whether a present period is a period for transferring the image data or compressed image data in the image memory to the image forming mechanism via the transfer circuit, and may controls the compressor/decompressor to compress the uncompressed image data in the image memory when the processor discriminates that the present period is not the period for transferring the image data or the compressed image data to the image forming mechanism.

In the above image forming apparatus, the processor may control the compressor/decompressor to decompress the original data when the original data is supplied from the host device, may detect whether time sequence for image forming based on the supplied print data reaches a predetermined timing, and may control the compressor/decompressor to quit decompressing the original data when the processor detects that the time sequence reaches the predetermined timing.

In this case, the predetermined timing may appear, for example, before a timing where the record medium reaches a predetermined position by conveyance in the image forming which appears after a maximum time period required for decompressing the original data for 1 block lapses since the predetermined timing.

In the above image forming apparatus, the processor may control the compressor/decompressor to decompress the original data in the buffer when an image data set in next block is standing by for data transfer, even if the processor discriminates that the present period is the period for transferring the image data or the compressed image data to the image forming mechanism.

In this case, the size of block for the original data may be equal to the size of block for the image data.

Or, the processor may switch the compressor/decompressor to compress the image data after saving the data being processed by the compressor/decompressor when the image data become transferable while the original data is being decompressed, and may switch the compressor/decompressor to decompress the print data again after restoring the saved data in the compressor/decompressor, when the image data transfer is resting or completed.

In the above image forming apparatus, the processor may control the compressor/decompressor to compress the uncompressed image data in the image memory when an image data set in next block is standing by for data transfer, even if the processor discriminates that the present period is the period for transferring the image data or the compressed image data to the image forming mechanism.

To accomplish the above object, a method according to a second aspect of the present invention is a method of controlling data compression/decompression in the above image forming apparatus, comprises:

discriminating whether a present period is a period for transferring the image data or the compressed image data in the image memory to the image forming mechanism via the transfer circuit; and controlling the compressor/decompressor to decompress the original data in the buffer when it is discriminated that the present period is not the period for transferring the image data or the compressed image data to the image forming mechanism.

The method may further comprise executing a predetermined program to decompress the original data in the buffer when it is discriminated that the present period is the period for transferring the image data or the compressed image data to the image forming mechanism.

The method may further comprising controlling the compressor/decompressor to decompress the original data in the buffer when an image data set in next block is standing by for data transfer, even if it is discriminated that the present period is the period for transferring the image data or the compressed image data to the image forming mechanism.

To accomplish the above object, a method according to a third aspect of the present invention is a method of controlling the above compression/decompression of data, comprises:

discriminating whether a present period is a period for transferring the image data or compressed image data in the image memory to the image forming mechanism via the transfer circuit; and controlling the compressor/decompressor to compress the uncompressed image data in the image memory when it is discriminated that the present period is not the period for transferring the image data or the compressed image data to the image forming mechanism.

To accomplish the above object, a method according to a fourth aspect of the present invention is a method of controlling the above compression/decompression of data, comprises:

controlling the compressor/decompressor to decompress the original data when the original data is supplied from the host device;

detecting whether time sequence for image forming based on the supplied print data reaches a predetermined timing; and controlling the compressor/decompressor to quit decompressing the original data when the detecting detects that the time sequence reaches the predetermined timing.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Preferred embodiments of the present invention will now be described with reference to accompanying drawings.

First Embodiment

Figure 1:
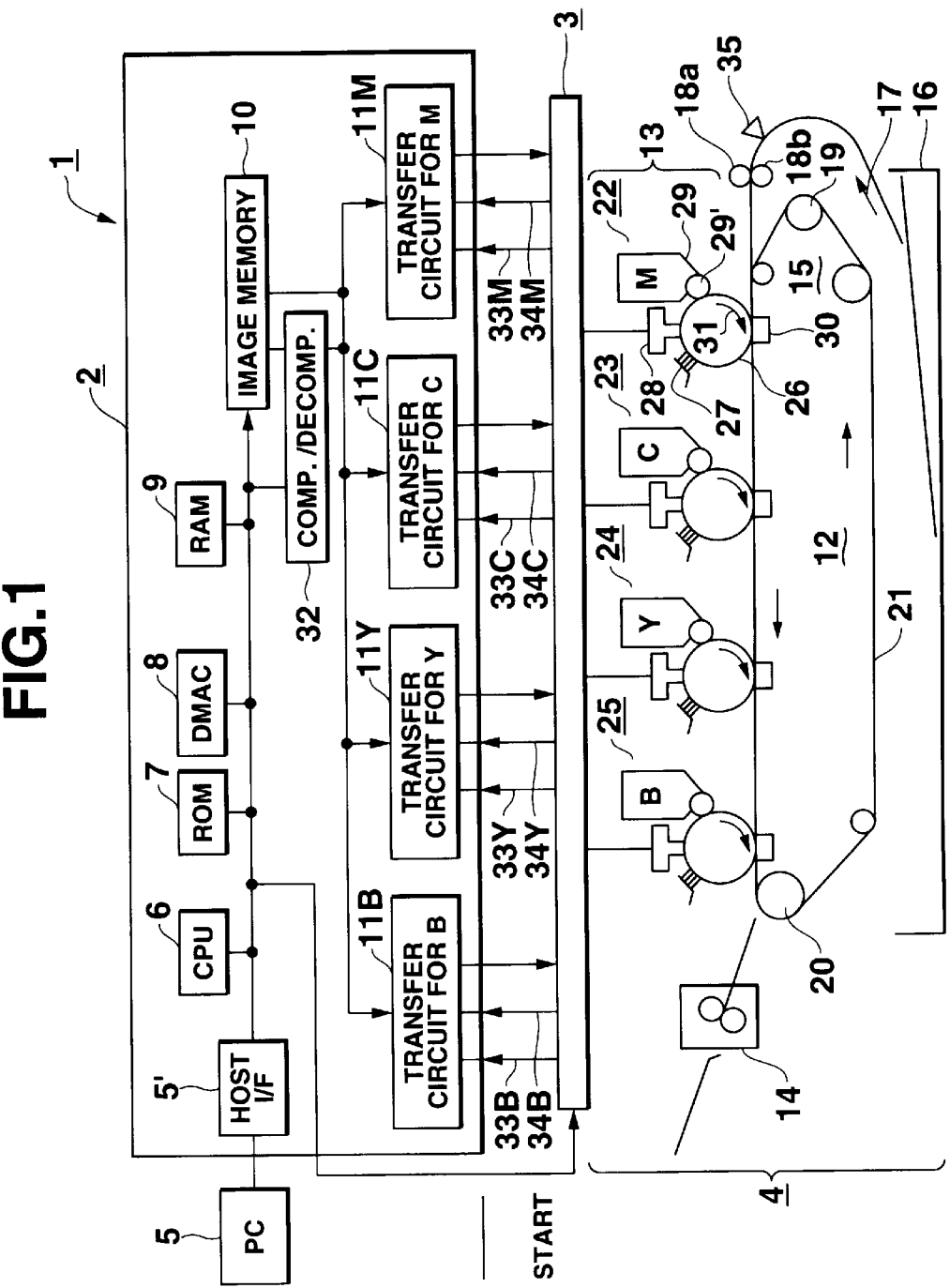
FIG. 1 is a diagram showing the structure of a color printer to which a first embodiment of the present invention is applied.

FIG. 1 is a diagram showing the structure of a color printer 1 to which the data compression/decompression according to a first embodiment is applied. The color printer 1 comprises an interface (I/F) controller 2, a printer controller 3, and a printer engine 4. Note that FIG. 1 illustrates the structure of the I/F controller 2 and the printer controller 3 by a block diagram, and the structure of the printer engine by a cross sectional view.

The I/F controller 2 comprises a host I/F (interface) 5', a CPU (Central Processing Unit) 6, a ROM (Read Only Memory) 7, a DMAC (Direct Memory Access Controller) 8, a RAM (Random Access Memory) 9, an image memory 10, transfer circuits 11 (11M, 11C, 11Y and 11B), and a compressor/decompressor 32.

A host device such as a PC (Personal Computer) 5, connected to the printer via a cable, supplies print data to the I/F controller 2. Thus supplied print data is source data for generating image data to be developed in the image memory 10. The print data are often compressed in an appropriate compression format with which the compressor/decompressor 32 can deal.

In the I/F controller 2, the host I/F 5' receives the print data supplied from the PC 5, and transfers them to the RAM 9 under a control of the DMAC 8. The CPU 6 executes later-described various kinds of processing in accordance with programs stored in the ROM 7. The ROM 7 stores the programs to be executed by the CPU 6. The RAM 9 functions as a work area of the CPU 6 for executing the programs. The RAM 9 also stores flag parameters (described later) prepared for discriminating whether the compressor/decompressor 32 is available or unavailable.

The image memory 10 stores image data sets prepared color by color, for example, magenta (M), cyan (C), yellow (Y), and black (B). For example, the image memory 10 has capacity for storing the image data sets for at least 1 page. The image data sets are prepared by the CPU 6 based on the print data in the RAM 9, and developed in the image memory 10. The DMAC 8 provides the image memory 10 with a control signal to output the image data sets in the image memory 10 line by line to the transfer circuits 11. In this case, the image data sets are output color by color to corresponding transfer circuits 11M, 11C, 11Y and 11B.

If the image memory 10 has an insufficient free area for storing newly generated image data, the compressor/decompressor 32 compresses the image data sets which have been already stored in the image memory 10, and the image memory 10 is refreshed with the compressed image data sets. The compressor/decompressor 32 will decompress the compressed image data sets in the image memory 10, and outputs the decompressed data sets color by color to the corresponding transfer circuits 11M, 11C, 11Y and 11B.

The compressor/decompressor 32 also decompresses the print data (given by the PC 5) which have been temporarily stored in the RAM 9, and the RAM 9 is refreshed with the decompressed print data. If such the compression/decompression tasks are required simultaneously, the first priority is given to decompressing the compressed image data sets stored in the image memory 10. In this case, other data compression/decompression is handled by the CPU 6 (in stead of the compressor/decompressor 32) with executing the program stored in the ROM 7.

The compressor/decompressor 32 can compress/decompress approximately 38 MB data per a second, while the CPU 6 can do the same with approximately 1 MB/sec. Capacity of the image memory 10 is approximately 37 MB, and the image memory 10 employs "band" (1 band=106 KB) as a unit for storing the image data. In this embodiment, the above described "insufficient free area" means that capacity of the free area is equal to or smaller than 1 band. The image data compression starts when this condition is satisfied.

Upon the reception of the instruction signal from the CPU 6, the DMAC 8 transfers the image data sets in the image memory 10 to the corresponding transfer circuits 11M, 11C, 11Y and 11B line by line and color by color. The DMAC 8 also transfers the print data (supplied from the PC 5 to the I/F 5') to the RAM 9.

Each of the transfer circuits 11M, 11C, 11Y and 11B transfers the image data set for 1 line (supplied from the DMAC 8) to the printer controller 3. After the transfer is completed, information indicating the transfer completion is given to the CPU 6.

The printer controller 3 outputs the received image data sets to the printer engine 4 with adjusting output timing so as to coincide with operation timing of the printer engine 4. At the same time, the printer controller 3 supplies busy signals 33M, 33C, 33Y and 33B, or acknowledge signals 34M, 34C, 34Y and 34B to the transfer circuits 11M, 11C, 11Y and 11B in accordance with the status of an image forming unit 13 (described later).

More precisely, the transfer circuits 11M, 11C, 11Y and 11B transfer the image data sets each for 1 line to the printer controller 3 while the acknowledge signals 34M, 34C, 34Y and 34B are being supplied thereto. On the contrary, the transfer circuits 11M, 11C, 11Y and 11B do not transfer the image data to the printer controller 3 while the busy signals 33M, 33C, 33Y and 33B are being supplied thereto.

The printer engine 4 comprises a mechanism 12 for feeding/conveying paper, the image forming unit 13, and a fixer 14. The mechanism 12 comprises a paper cassette 16 in which plural sheets of paper P are stacked, and a conveyer system 15.

The conveyer system 15 comprises a paper feed roller (not shown), a set of feed rollers 18a and 18b, a sensor 35, conveyer rollers 19 and 20, and a belt 21. The paper feed roller picks up a sheet of paper P in the cassette 16, and the set of feed rollers 18a/18b conveys the picked-up sheet of the paper P in the direction shown by an arrow 17 at a timing which enables transfers of toner images onto the sheet of the paper P at appropriate timing. The sensor 35 detects whether the sheet of the paper P reaches the roller set 18a/18b. The conveyer rollers 19 and 20 are driven by drive motors (not shown) to drive the belt 21. The driven belt 21 conveys the sheet of the paper P.

The sheet of the paper P is picked up from the cassette 16 and conveyed in the direction of the arrow 17 toward the feed rollers 18a and 18b. Upon the detection of the sensor 35, the sheet of the paper P is conveyed by the belt 21 at an appropriate timing which enables toner image transfer from drums (described later) to the sheet of the paper P. The image forming unit 13 transfers the toner images color by color onto the sheet of the paper P which has been conveyed by the belt 21.

The image forming unit 13 comprises imaging units 22 to 25 corresponding to four colors: magenta (M), cyan (C), yellow (Y) and black (B). In this embodiment, the imaging units 22 to 25 are arranged in the above color order, that is, the unit for magenta is the first unit and that for black is the last unit. The structural difference among the units 22 to 25 is just toner color. That is, each of the units 22 to 25 has the same mechanical structure including a photosensitive drum 26, a charge applier 27, an LED head 28, a toner container 29, and a toner attractor 30.

The drum 26 has the round surface formed of, for example, an organic photoconductive cartridge, and rotates in the direction indicated by an arrow 31. The round surface of the drum 26 is provided with a charge by the charge applier 27. An electrostatic latent image will be formed on the round surface of the drum 26 by optical writing performed by the LED head 28, and a toner image will be formed after the toner supply performed by a toner supply roller 29'.

The charge applier applies a charge to the drum 26. The LED head 28 emit lights toward the charged drum 26 in accordance with the image data supplied by the printer controller 3, thus, the electrostatic latent image is formed on the round surface of the drum 26. The toner supply roller 29' supplies the toner in the toner container 29 to the round surface of the drum 26, thus, the toner image is formed in accordance with the electrostatic latent image on the drum 26. The toner attractor 30 attracts the toner image on the drum 26 which is just opposite to the toner attractor 30. The attracted toner image is transferred to the sheet of the paper P conveyed by the belt 21.

In the same manner, each of the imaging units 22 to 25 performs image transfer for every colors magenta (M), cyan (C), yellow (Y) and black (B). This printing is so-called subtractive mixture color printing. The fixer 14 applies heat to the sheet of the paper P on which the four-color toner images have been transferred, in order to fix the toner on the sheet of the paper P. After the color imaging is completed, the sheet of the paper P is ejected from the printer 1.

Figure 2:
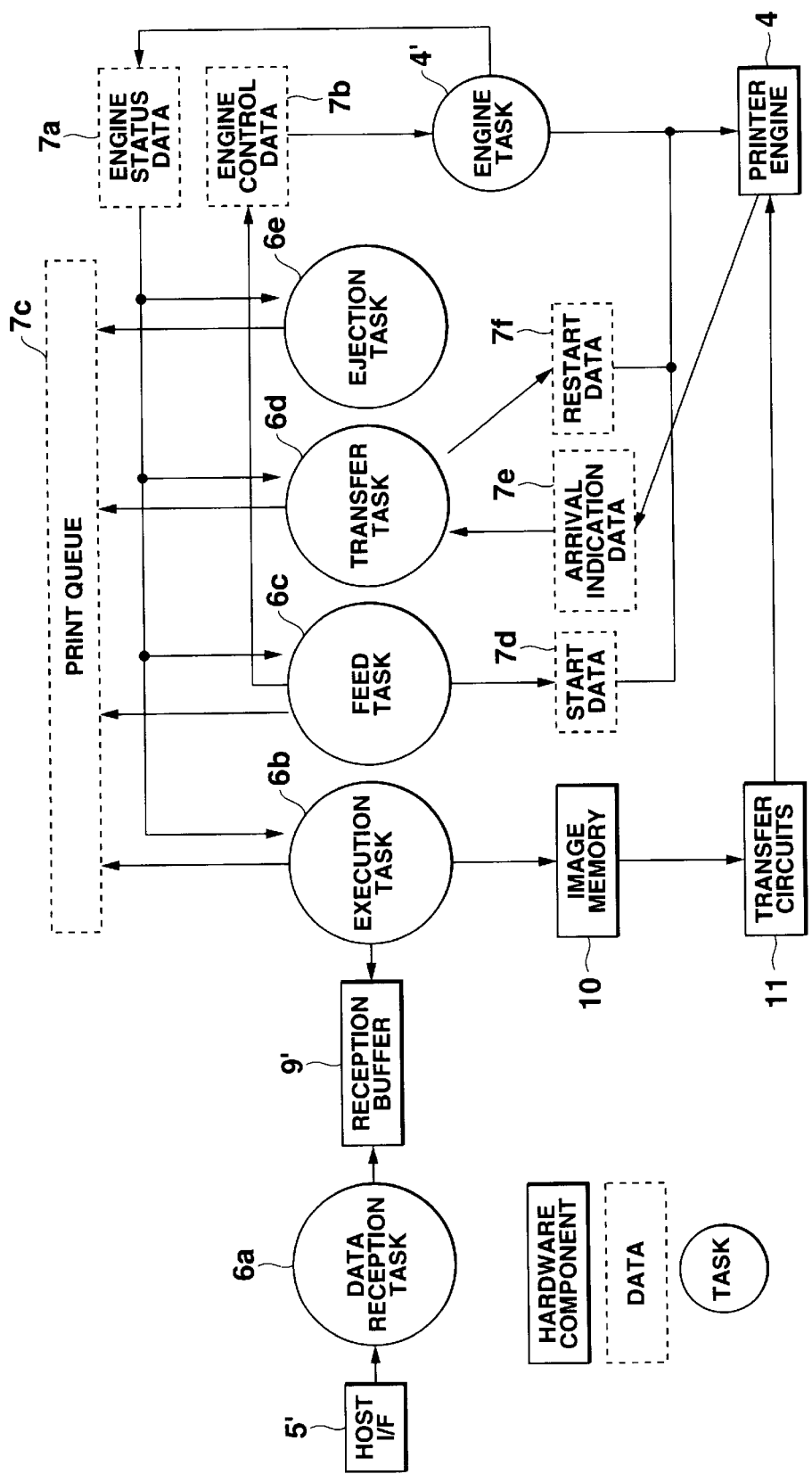
FIG. 2 is a diagram showing functions of a control system in the color printer shown in FIG. 1.

FIG. 2 is a diagram showing functions of a control system of the printer 1 shown in FIG. 1. Functions of the control system are realized by the CPU 6 with executing the operating system stored in the ROM 7. In FIG. 2, solid-line rectangular objects represent hardware components, broken-line rectangular objects represent processing or data handled by the CPU 6 in accordance with the running operating system, and circle objects represent tasks generated during operating system execution.

Upon the print data are supplied from the PC 5 to the host I/F 5', the CPU 6 executes a reception task 6b to store the print data to a reception buffer 9' in the RAM 9. When the amount of the print data in the reception buffer 9' reaches a predetermined level, the CPU 6 executes an execution task 6b to analyze the print data. As a result of the analysis, image data sets are prepared color by color, and those data sets are stored in the image memory 10. If the print data had been previously compressed before they supplied from the PC 5, the compressor/decompressor 32 or the CPU 6 decompresses the print data, and the reception buffer 9' is refreshed with the decompressed data.

In response to the execution of a transfer task 6d (described later) by the CPU 6, the image data sets in the image memory 10 are transferred to the transfer circuits 11M, 11C, 11Y and 11B, and they are further transferred to the LED heads 28 via the printer controller 3. A feed task 6c is executed before the execution of the transfer task 6d, thus, the sheet of the paper P is fed. In response to the execution of the feed task 6c, start data 7d and engine control data 7b are generated. The CPU 6 executes an engine task 4' based on the generated engine control task 7b. In response to the execution of the engine task 7b, the start data 7d and restart data 7f are set to the printer engine 4, and the printer engine 4 is driven as described above. After the execution of the transfer task 6d, an ejection task 6e is executed, thus, the sheet of the paper P is ejected from the printer 1.

The start data 7d represent an instruction to drive the paper feed roller (not shown) placed above the paper cassette 16. The restart data 7f represent an instruction to restart conveyance of the sheet of the paper P halting at the feed roller set 18a/18b. In response to the detection by the sensor 35 that indicates arrival of the sheet of the paper P, arrival indication data 7e is set to the transfer task 6d. The engine task 4' monitors status of the printer engine 4, and outputs engine status data 7a. The tasks 7b to 7e refer the engine status data 7a, and reflect the referred engine status data 7a to their process. The execution task 6b, feed task 6c, transfer task 6d and ejection task 6e are sequentially executed in accordance with print queue 7c.

Figure 3:
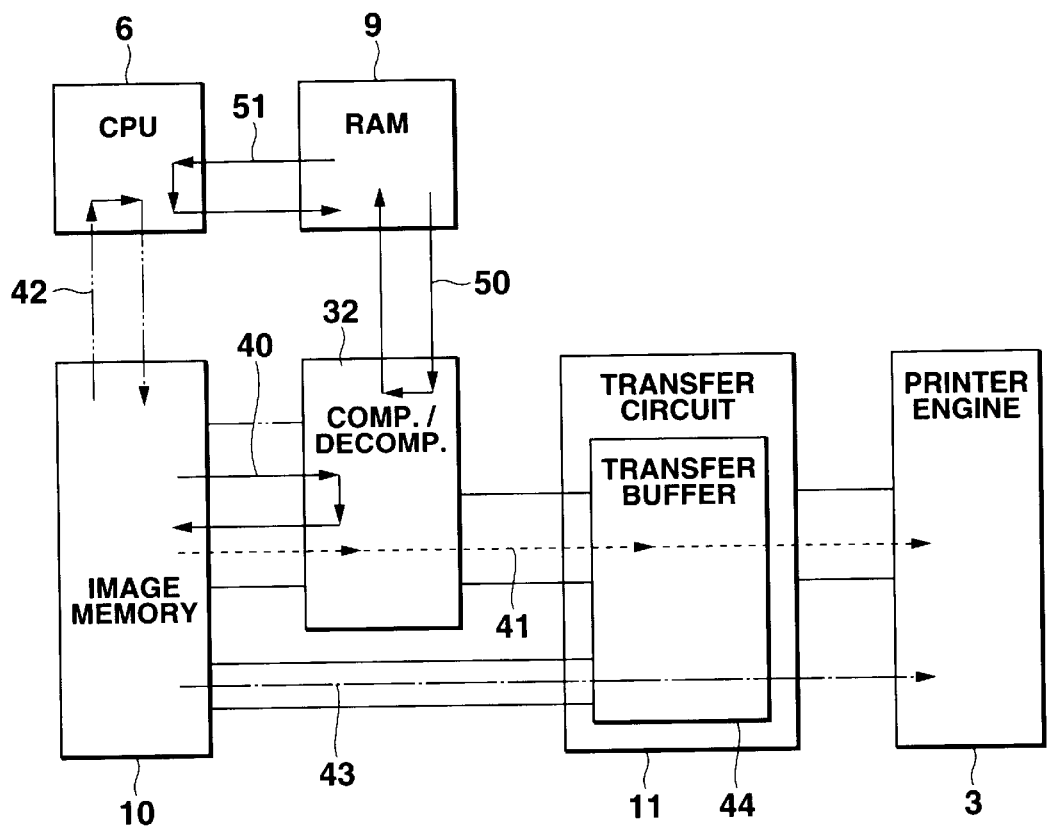
FIG. 3 is a diagram showing data flows of image data and print data.
Figure 4:
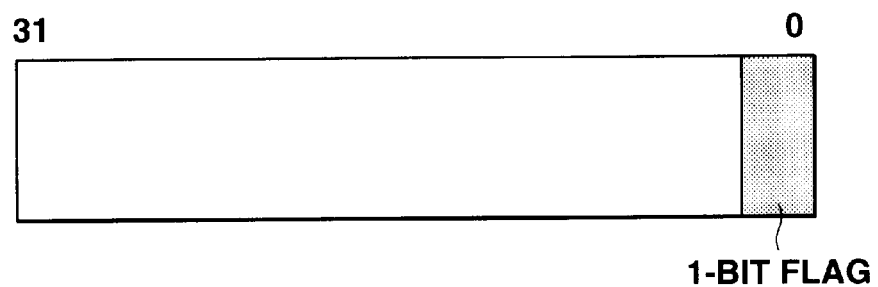
FIG. 4 is a diagram exemplifying flag status representing available/unavailable of a compressor/decompressor.

FIG. 3 is a diagram showing data flows of the image data stored in the image memory 10 and the print data stored in the RAM 9. In FIG. 3, reference numeral 11 denotes one of the four transfer circuits 11M for magenta, 11C for cyan, 11Y for yellow and 11B for black.

In a case where the image memory 10 has an insufficient free area while the image data in the image memory 10 is being compressed, the compressor/decompressor 32 retrieves the image data from the image memory 10 to compress them, and the image memory 10 is refreshed with the compressed image data. This data flow is indicated by an arrow 40 in FIG. 3. According to this data compression process, the free area in the image memory 10 has been expanded.

In case of transferring compressed image data in the image memory 10, the compressor/decompressor 32 retrieves the compressed data from the image memory 10 to decompress them. The decompressed image data are transferred to the printer controller 3 via the transfer buffer 44 in the transfer circuit 11. This data flow is indicated by an arrow 41 in FIG. 3.

In a case where the image memory 10 has an insufficient free area while the compressed image data in the memory 10 have already been decompressed, data compressing by the compressor/decompressor 32 is skipped. In this case, the CPU 6 retrieves the image data from the image memory 10 to compress them by software processing in accordance with the program stored in the ROM 7, and the image memory 10 is refreshed with the compressed image data. This data flow is indicated by an arrow 42 in FIG. 3. Thus, the free area of the image memory 10 is expanded.

In case of transferring uncompressed image data in the image memory 10, the image data in the image memory 10 is directly transferred to the printer controller 3 via the transfer buffer 44 in the transfer circuit 11. This data flow is indicated by an arrow 43 in FIG. 3.

As for the print data supplied from th e PC 5 to the host I/F 5', the compressor/decompressor 32 retrieves the compressed print data from the reception buffer 9' to decompress them, and the reception buffer 9' is refreshed with the decompressed print data. This process is carried out in a case where the compressor/decompressor 32 is not occupied with compressing/decompressing the image data. This data flow is indicated by an arrow 50 in FIG. 3. On the contrary, the compressor/decompressor 32 is occupied with compressing/decompressing the image data, the CPU 6 retrieves the print data from the reception buffer 9' to decompress them by software processing, and the reception buffer 9' is refreshed with the decompressed print data. This data flow is indicated by an arrow 51 in FIG. 3.

If 1 word of the RAM 9 is 32 bits in length, the 0th bit of any one of the words is utilized as a flag indicating whether the compressor/decompressor 32 is available or unavailable for print data decompression. When the flag represents 0 (the flag is reset), the compressor/decompressor 32 is available for decompressing the print data. On the contrary, the circuit 32 is unavailable for the decompression when the flag represents 1 (the flag is set). In other words, users of the compressor/decompressor 32, that is, the execution task 6b and the transfer task 6d, are mutually exclusive in accordance with the 1-bit flag.

Figure 5:
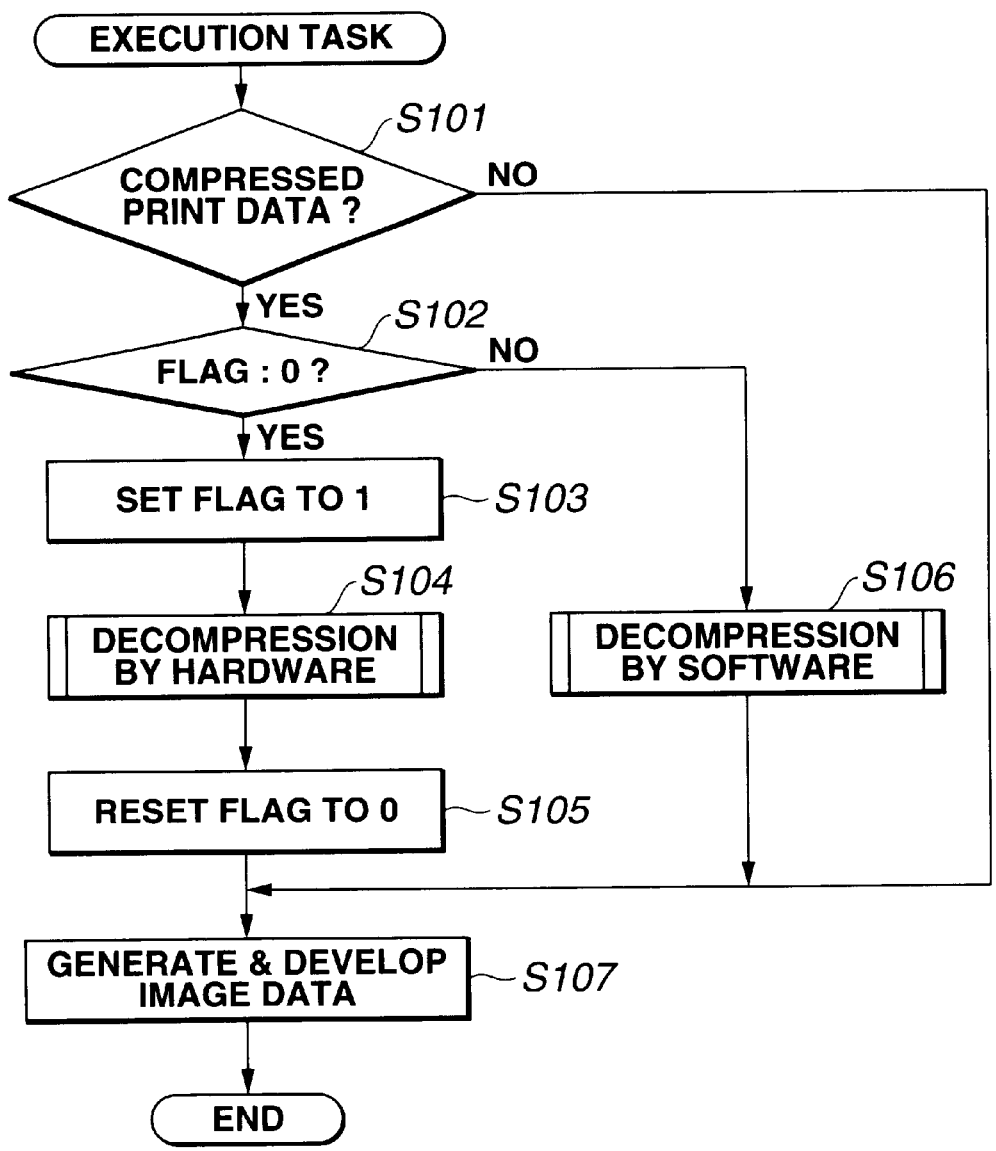
FIG. 5 is a flowchart showing steps of execution task according to the first embodiment of the present invention.

FIG. 5 is a flowchart showing steps to be executed through the execution task 6b. Once the execution task 6b is executed, the CPU 6 accesses the reception buffer 9' to discriminate whether the print data set therein has been compressed or not (step S101). If the print data set is uncompressed one, the process flow jumps to step S107.

If the print data set is compressed one, the CPU 6 discriminates whether the flag has been reset (flag: 0) or not (step S102). If the flag has been reset, the CPU 6 sets the flag to 1 (step S103). Th en, the CPU 6 provides the compressor/decompressor 32 with an instruction to decompress the compressed print data set in the reception buffer 9', and to refresh the buffer 9' with the decompressed print data (step S104). After the decompression is completed, the CPU 6 resets the flag to 0 (step S105). And the process flow proceeds to step S107.

If it is discriminated in step S102 that the flag has been set (flag: 1), the CPU 6 executes a predetermined program in the ROM 7 to decompress the compressed print data in the reception buffer 9', and to refresh the buffer 9' with the decompressed print data (step S106). That is, the data decompression is done by software processing. And the process flow proceeds to step S107.

In step S107, the CPU 6 generates image data based on the print data in the reception buffer 9', and develops the generated image data in the image memory 10. If the free area of the image memory 10 is insufficient, the CPU 6 or the compressor/decompressor 32 decompresses previously stored image data in the image memory 10 to prepare sufficient free area. Then, the CPU 6 develops the newly generated image data in the image memory 10. After the image data development, the CPU 6 terminates the processing of the execution task 6b.

Figure 6:
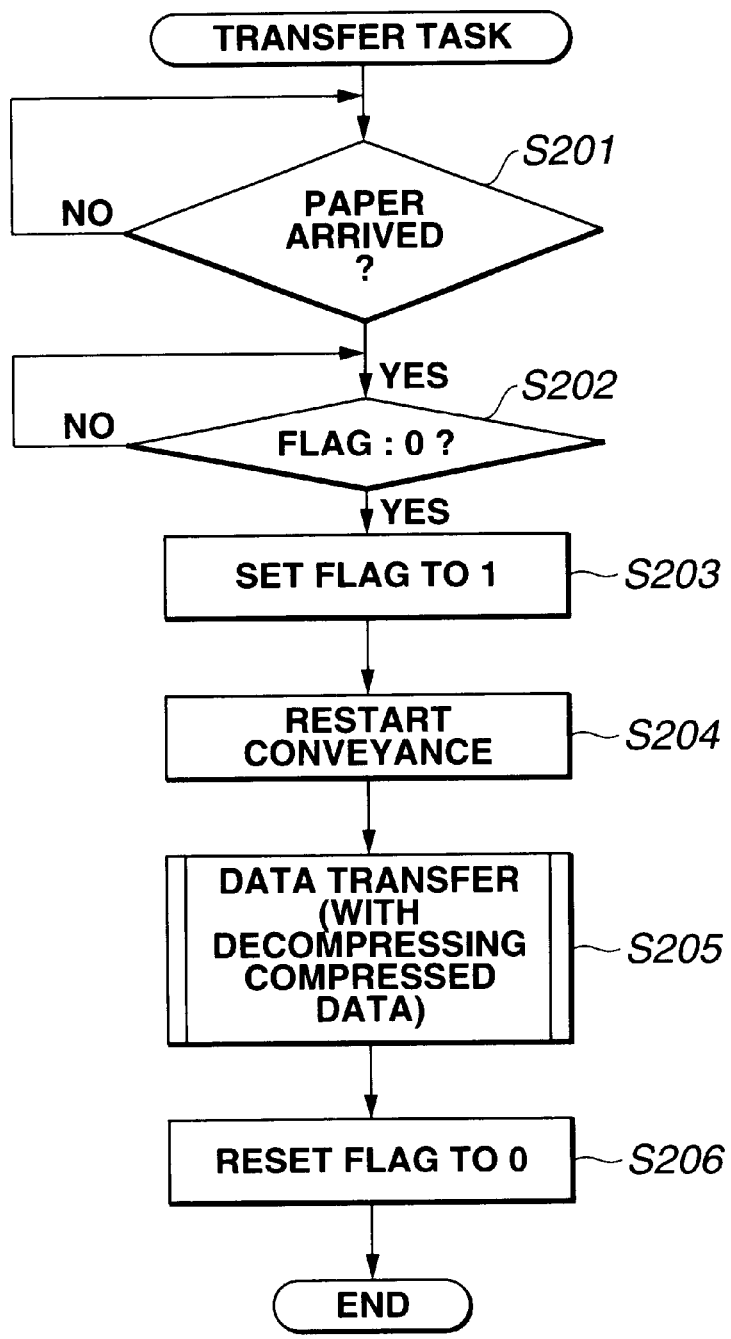
FIG. 6 is a flowchart showing steps of transfer task according to the first embodiment of the present invention.

FIG. 6 is a flowchart showing steps to be executed through the transfer task 6d. Once the feed task 6c is executed, the printer engine 4 starts to feed the sheet of the paper P upon reception of the start data 7d. The CPU 6 discriminates whether the sheet of the paper P reaches the position of the sensor 35 or not, based on the arrival indication data 7e (step S201). The discrimination of step S201 is repeatedly performed until the sheet of the paper P reaches the sensor 35.

When it is discriminated at step S201 that the sheet of the paper P reaches the sensor 35, the CPU 6 discriminates whether the flag has been reset or not (step S202). In a case where the flag is set (flag: 1), that is, the print data decompression at step S104 of the execution task 6b has not been completed yet, the discrimination at step S202 is performed repeatedly until the flag is reset.

In a case where the flag has been reset (flag: 0), the CPU 6 sets the flag (step S203). Then, the CPU 6 sets the restart data 7f to the printer engine 4, thus the sheet of the paper P is forwarded again (step S204).

The CPU 6 transfers image data sets in the image memory 10 to the transfer circuits 11M, 11C, 11Y and 11B color by color. Here, the data transfer are performed line by line. If the image data sets have been compressed, the compressor/decompressor 32 decompresses the image data sets before transferring the data sets (step S206). After the data transfer is completed, the transfer task 6d is terminated.

Set/Reset timing of the flag will now be described with reference to a timing chart shown in FIG. 7.

Upon the print data reception from the PC 5, the sheet of the paper P is forwarded to the sensor 35 in accordance with the start data 7d. At a timing where the print data reception starts, the flag is set. Thus, the compressor/decompressor 32 can decompresses the print data. After the decompression of the print data is completed, the flag is reset.

When the sheet of the paper P reaches the sensor 35, the flag is set again. Then, the image data sets in the image memory 10 are transferred to the transfer circuits 11M, 11Y, 11C and 11B. That is, the compressor/decompressor 32 is occupied with decompressing the compressed image data. During the image data decompressing, print data decompressing rests.

After the data transfer from the image memory 10 to the transfer circuits 11M, 11Y, 11C and 11B is completed, the flag is reset. Therefore, the compressor/decompressor 32 is available for decompressing the print data until the sheet of the paper P is ejected from the printer 1.

Figure 7:
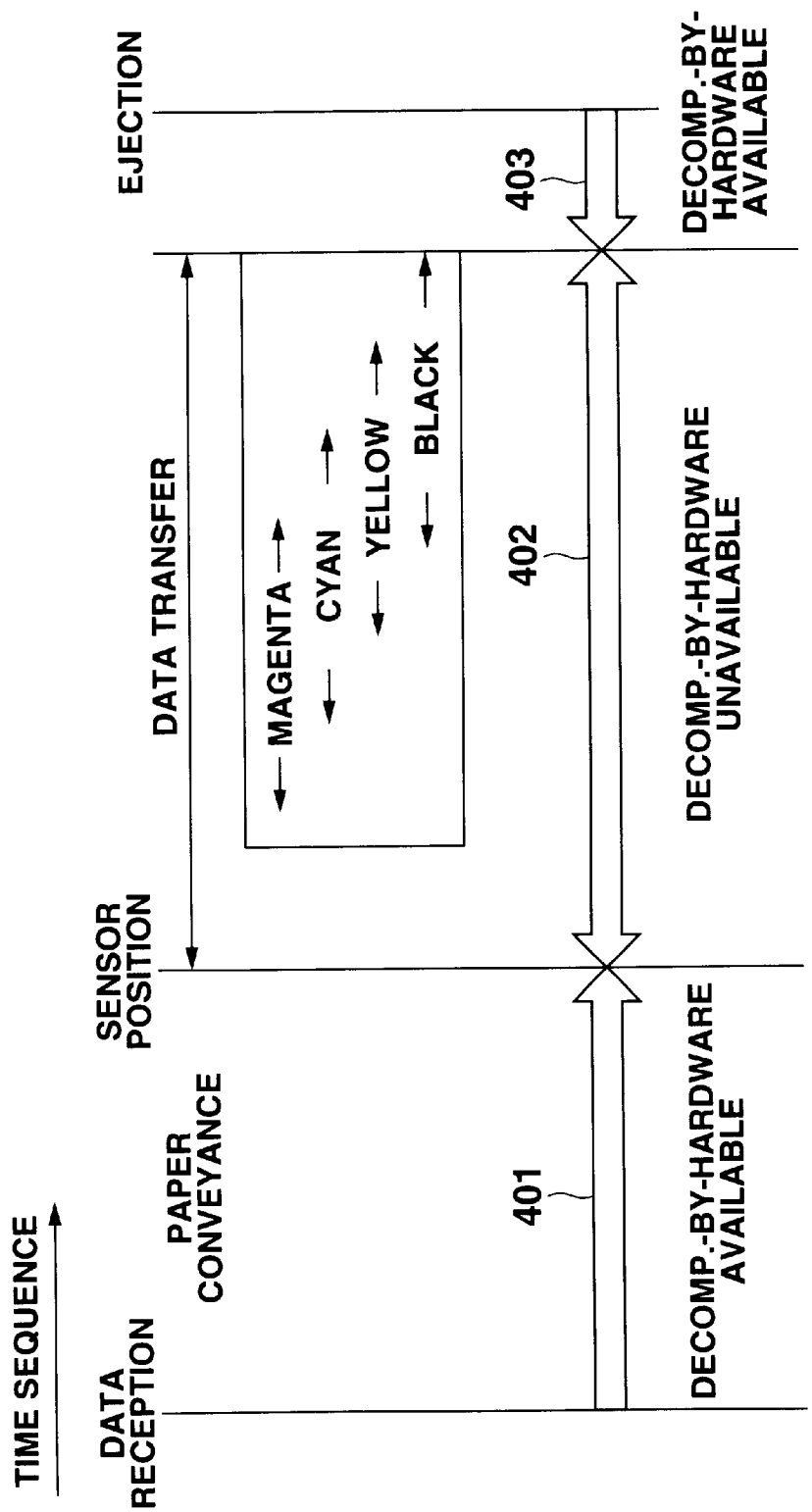
FIG. 7 is a timing chart representing timings of states where the compressor/decompressor is available or unavailable according to the first embodiment of the present invention.

In FIG. 7, a reference numeral 401 denotes a period from print data reception to detection by the sensor 35, a reference numeral 402 denotes a period from the detection by the sensor 35 to end of the data transfer, and a reference numeral 403 denotes a period from the end of the data transfer to sheet ejection. The compressor/decompressor 32 can decompress newly arrived print data from the PC 5 in a case where the new print data is received during either the period 401 or the period 403. However, if the newly arrived print data is received during the period 402, the received print data is decompressed by software processing executed by the CPU 6 instead of the compressor/decompressor 32.

As described above, the printer according to this embodiment enables high speed print data decompression, because the compressor/decompressor 32 decompresses the compressed print data supplied from the PC 5. As a result, required time period for imaging as a whole will be shortened.

Second Embodiment

In the first embodiment, print data decompression by the compressor/decompressor 32 and image data generation have ordinary been completed before the sheet of the paper P reaches the sensor 35. However, the sheet of the paper P sometimes reaches the sensor 35 before the decompression and image data generation are completed. In this case, the conveyance of the sheet of the paper P must halted until the print data decompression and the image data generation are completed. As a result, process time of the printer is elongated.

Figure 8:
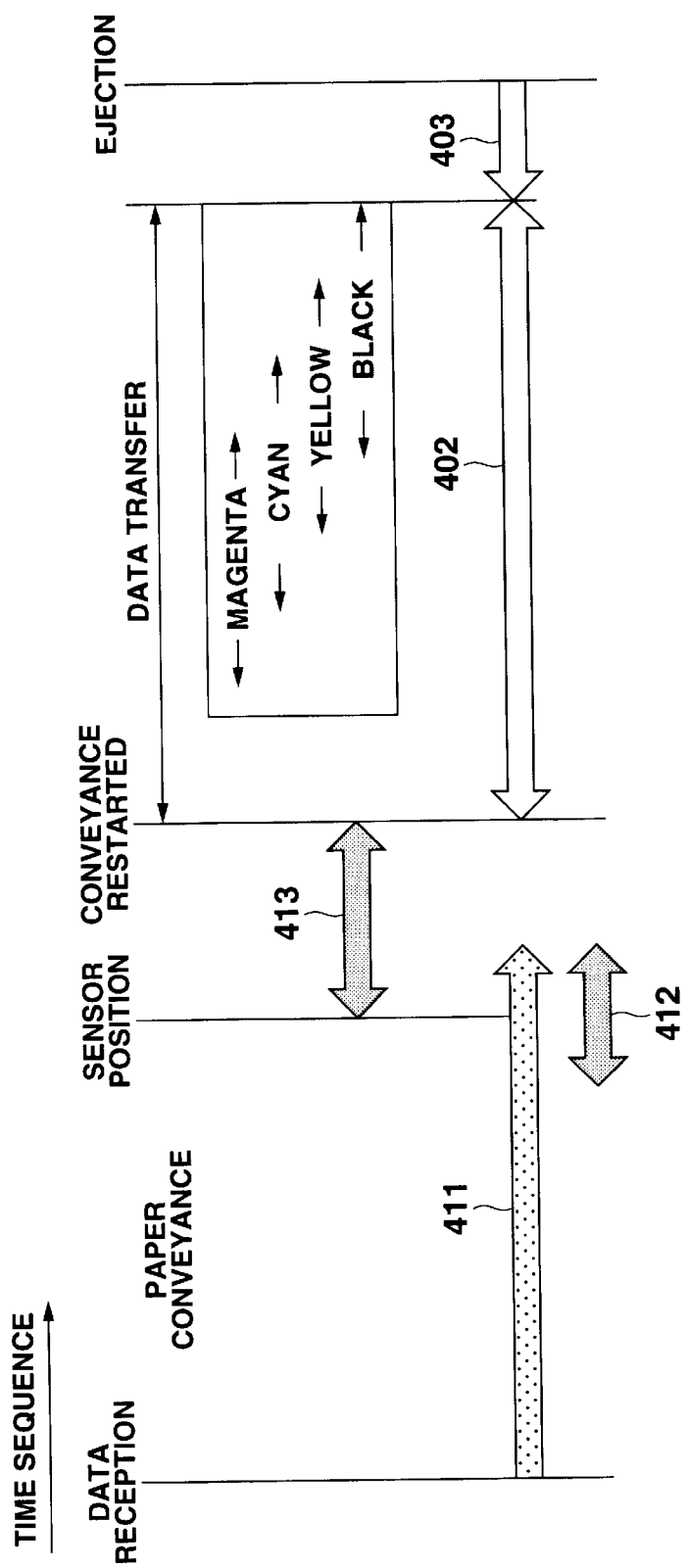
FIG. 8 is a timing chart representing timing of states where the compressor/decompressor is available or unavailable while conveyance of a sheet of paper is being halted.

FIG. 8 is a timing chart showing periods whether the compressor/decompressor 32 is available or not, in the case where conveyance of the sheet of the paper P is halted. In FIG. 8, a reference numeral 411 denotes a period where the print data sets are being decompressed by the compressor/decompressor 32. A reference numeral 412 denotes a period where a last set of the print data is being decompressed by the compressor/decompressor 32. That is, FIG. 8 shows a state where the compressor/decompressor 32 is still occupied with decompressing the print data when the sheet of the paper P reaches the sensor 35, thus, conveyance of the sheet of the paper P is being halted. In other words, the conveyance of the sheet of the paper P is halted until the print data decompression during a period 413 is completed, therefore, the process time of the printer is elongated.

To overcome the above problem, the second embodiment features a printer which enables the compressor/decompressor 32 to complete print data decompression before the sheet of the paper P reaches the sensor 35. In order to accomplish such the structure, an additional flag indicating whether the print data decompression is inhibited or not (hereinafter, referred to as a second flag) is prepared in addition to the flag indicating whether the compressor/decompressor is available or unavailable for print data decompression (hereinafter, referred to as a first flag). Statuses of the first and second flags are stored in the RAM 9. In this embodiment, process flows for the execution task 6b and the transfer task 6d are modified in accordance with the additional flag.

Figure 9:
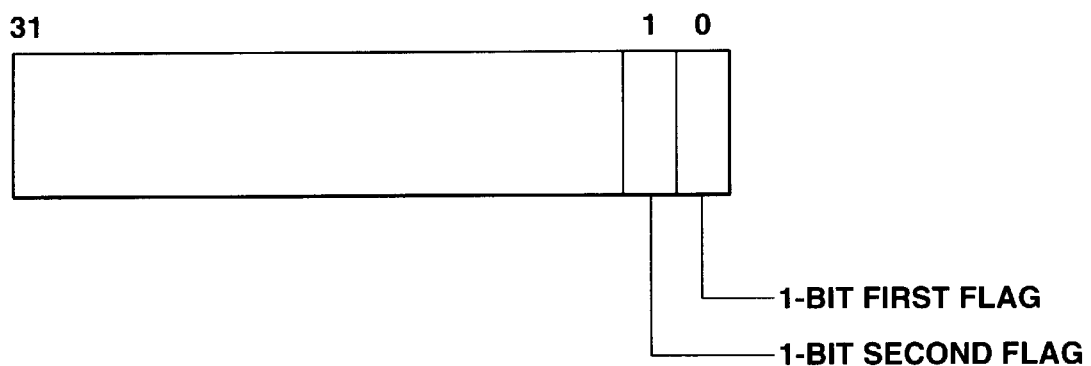
FIG. 9 is a diagram exemplifying a flag representing whether the compressor/decompressor is available, and another flag representing whether print data decompression is inhibited.

FIG. 9 is a diagram exemplifying the structure of the first and second flags. As shown in FIG. 9, the 0th bit of any one word is used for the first flag, while the 1st bit thereof is used for the second flag.

The first flag is the same as that described in the first embodiment. That is, when the flag is set (flag: 1), the compressor/decompressor 32 is unavailable for print data decompression. In this embodiment, when both the first and second flags are reset (flags: 0), the compressor/decompressor 32 is available for the print data decompression.

Figure 10:
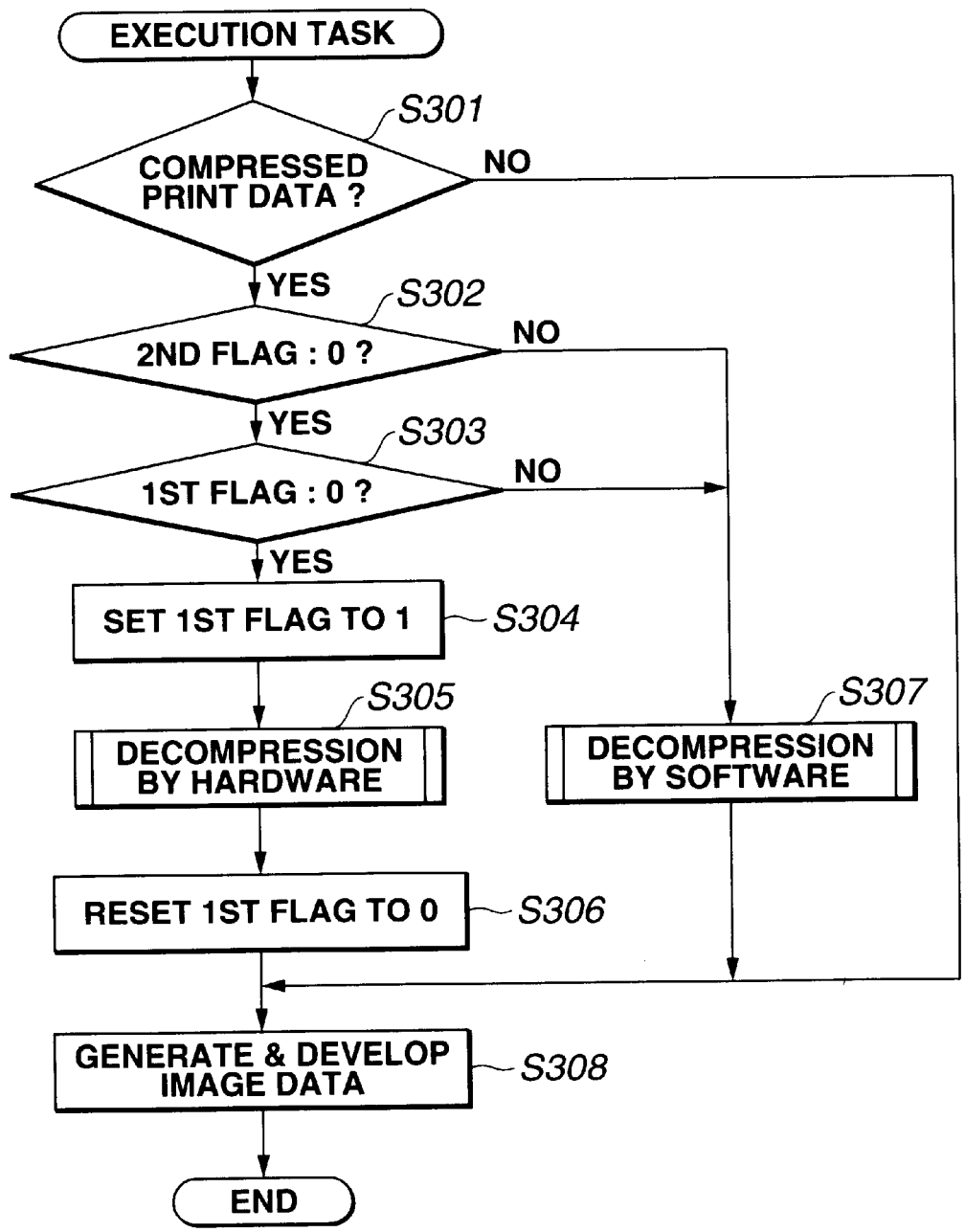
FIG. 10 is a flowchart showing steps of execution task according to the second embodiment of the present invention.

FIG. 10 is a flowchart showing steps of execution task 6b according to this embodiment. Once the execution task 6b is executed, the CPU 6 accesses the buffer 9' to discriminate whether the received print data set therein has been compressed or not (step S301). If the print data set is uncompressed one, the process flow forwards to later-described step S308.

If the print data set is compressed one, the CPU 6 discriminates whether the second flag has been reset (2nd flag: 0) or not (step S302). If it is discriminated at step S302 that the second flag has been reset, the CPU 6 further discriminates whether the first flag has been reset (1st flag: 0) or not. If the first flag has been reset, the CPU 6 sets the first flag to 1 (step S304).

Then the CPU 6 instructs the compressor/decompressor 32 to decompress the compressed print data in the reception buffer 9', and to refresh the buffer 9' with the decompressed print data (step S305). After the print data decompression by the compressor/decompressor 32 is completed, the CPU 6 resets the first flag (step S306). Then the process flow forwards to later-described step S308.

If it is discriminated at step S302 that the second flag has been set (2nd flag: 1), or if it is discriminated at step S303 that the first flag has been set (1st flag: 1), the print data decompression is carried out by software processing. That is, the CPU 6 executes the predetermined program in the ROM 7 to decompress the compressed print data in the reception buffer 9' (step S307), and the buffer 9' is refreshed with the decompressed print data. Then the process flow forwards to later-described step S308.

In step S308, the CPU 6 generates image data based on the print data, and develops the generated image data in the image memory 10. In a case where the image memory 10 has insufficient free area for the image data development, the CPU 6 or the compressor/decompressor 32 decompresses the image data which has been stored in the image memory 10 to expand the free area, and develops the newly generated image data in the expanded free area. After the image data development is completed, the CPU 6 terminates the execution task 6b.

Figure 11:
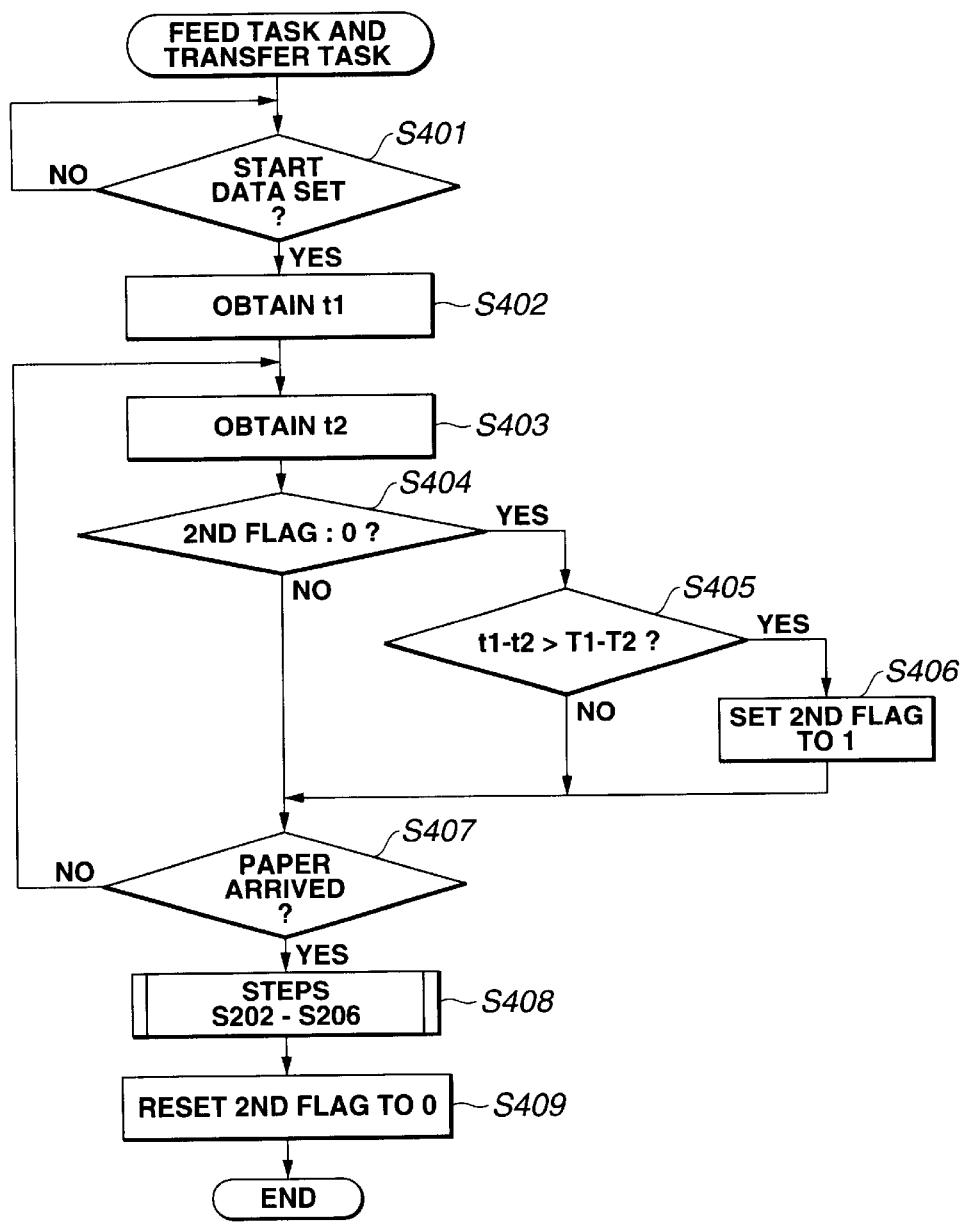
FIG. 11 is a flowchart showing steps of feed and transfer task according to the second embodiment of the present invention.

FIG. 11 is a flowchart showing steps of feed task 6c and transfer task 6d according to the second embodiment. Once the feed task 6c is executed, the CPU 6 discriminates whether conveyance of the sheet of the paper P has been started in accordance with the start data 7d or not (step S401). The CPU 6 performs step S401 repeatedly until the conveyance of the sheet of the paper P starts.

If the conveyance of the sheet of the paper P has been started, the CPU 6 obtains start time t1 which represents the time when the conveyance started (step S402). The CPU 6 further obtains present time t2 at a predetermined timing after the conveyance started (step S403).

Then the CPU 6 discriminates whether the second flag has been reset (2nd flag: 0) or not (step S404). If the second flag has been reset, the CPU 6 compares a lapsed time period since the conveyance stated with a predetermined time difference (T1−T2) (step S405). In this case, the lapsed time period is obtained based on time difference between present time t2 and start time t1 (t2−t1). The time T1 represents a time period for the conveyance of the sheet of the paper P, that is, from a point where the conveyance started to a point where the sheet of the paper P reaches the sensor 35. The time T2 represents a maximum time period required for decompressing the print data for 1 block. The time T2 may be obtained based on the size of buffer in the PC 5 used for compressing the print data.

If the lapsed time period (t2−t1) is larger than the time difference (T1−T2), the CPU 6 sets the second flag (step S406), and the process flow forwards to step S407. If it has been discriminated at step S404 or S405 that the second flag has been reset or the lapsed time period is equal to or smaller than the time difference (T1−T2), the process flow directly forwards to step S407 without setting the second flag.

In step S407, the CPU 6 discriminates whether the sheet of the paper P reaches the sensor 35 based on the arrival indication data 7e. If the sheet of the paper P is still on the conveyance, the CPU 6 repeatedly performs steps S403 to S407 until the sheet of the paper P reaches the sensor 35.

Upon the arrival of the sheet of the paper P, the CPU 6 performs steps S202 to S206 shown in FIG. 6 in order to transfer the image data sets stored from the image memory 10 to the transfer circuits 11M, 11C, 11Y and 11B (step S408). After the data transfer is completed, the CPU resets the first flag (step S409), and terminates the transfer task 6b.

Figure 12:
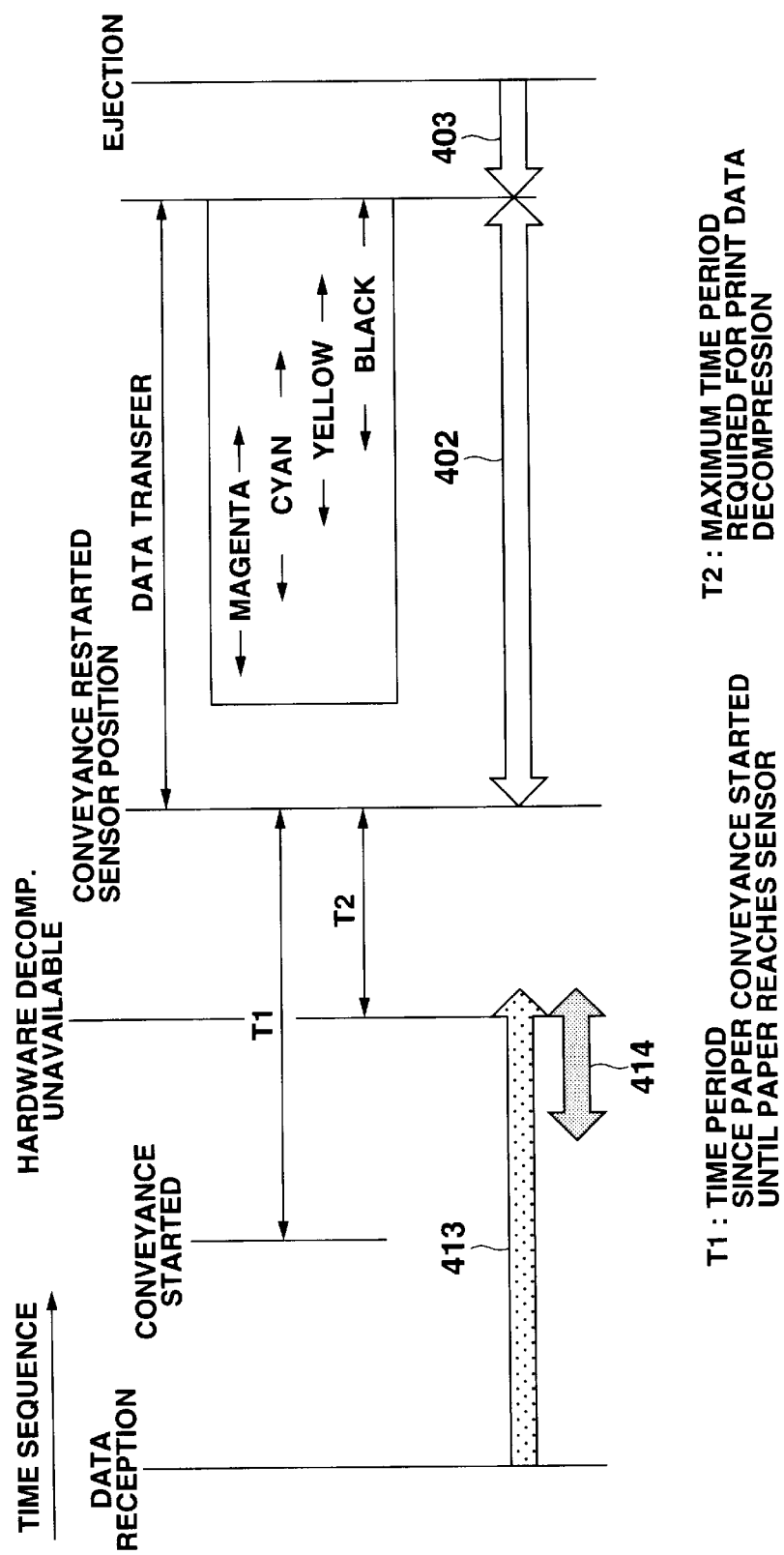
FIG. 12 is a timing chart showing timings whether the compressor/decompressor is available, according to the second embodiment of the present invention.

FIG. 12 is a timing chart showing periods wherein the compressor/decompressor 32 is available or unavailable for the print data decompression. Timings of the periods will now be described with reference to FIG. 12. In FIG. 12, the compressor/decompressor 32 will be unavailable at a point where the lapsed time period coincides with the time difference (T1–T2). Print data set for at least any one block will be decompressed completely during a time period from the unavailable point to a point of paper detection by the sensor 35.

Upon reception of the print data from the PC 5, the compressor/decompressor 32 starts to decompress the print data simultaneously with the conveyance of the sheet of the paper P. A period 414 shown in FIG. 12 represents a time period (slot) where the decompression of the print data for 1 block. Since the compressor/decompressor 32 decompresses the print data block by block, if the period 414 extends behind the unavailable point, the print data decompression by the compressor/decompressor 32 is suspended. In other words, the print data decompression by the compressor/decompressor 32 represented by a period 413 is always completed before the paper reaches the sensor 35.

The print data decompression by the compressor/decompressor 32 is resting until the sheet of the paper P just reaches the sensor 35. This feature allows the printer engine 4 to restart the conveyance of the sheet of the paper P without waiting, by setting the restart data 7f to the printer engine 4 at a timing substantially the same as a timing where the sheet of the paper P reaches the sensor 35.

In the printer according to this embodiment, the compressor/decompressor 32 always completes the print data decompression before the sheet of the paper P reaches the sensor 35. As a result, the conveyance of the sheet of the paper P restarts simultaneously with arrival of the sheet of the paper P, thus, process time of the printer as a whole will be reduced.

Third Embodiment

In the conventional printer, block size of the print data supplied from the host device PC 5 differs from block size of the image memory 10. In such the structure, the compressor/decompressor 32 is inhibited to decompress the print data while the image data are being transferred to the transfer circuits 11M, 11C, 11Y and 11B with decompressing, in order to avoid delay in the image data transfer caused by the print data decompression by the compressor/decompressor 32.

A feature of this embodiment is to divide the print data so that the block size of the print data coincides with the size for 1 block in the image memory 10, and to transfer thus divided print data to the printer 1 after compression.

Figure 13:
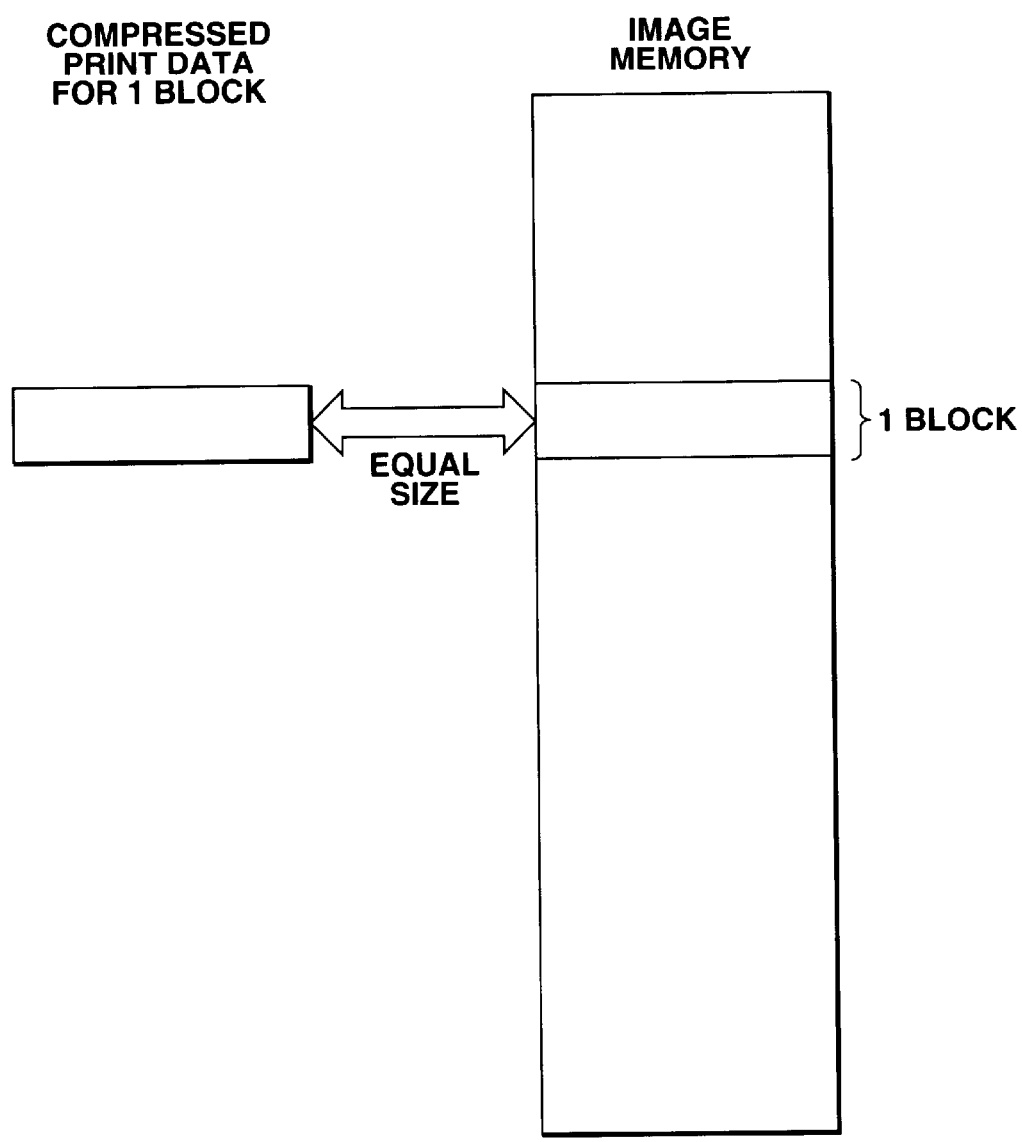
FIG. 13 is a diagrams showing a relationship between block sizes of print data and the image memory according to a third embodiment of the present invention.

FIG. 13 is a diagram showing a relationship between the block size of compressed print data according to this embodiment and the block size of the image memory 10. As shown in FIG. 13, the block size of the print data coincides with the size for 1 block in the image memory 10. In this case, the block size for the print data may be adjusted by, for example, software processing. That is, an appropriate program designed for adjusting the block size should be installed in the PC 5 together with the printer driver for the printer 1. The PC 5 may execute the installed program to adjust the block size of the print data.

This embodiment does not require any flags representing whether the compressor/decompressor 32 is available, and representing whether decompression of the print data is inhibited, described in the first and second embodiments.

Process through the execution task 6b and the transfer task 6d according to this embodiment will now be described. The process of the execution task 6b is similar to that described in the first embodiment, except the following additional steps follow to step S205 in the first embodiment. Since there is no processing dealing with flags, steps S202, S203 and S206 in the transfer task 6d described in the first embodiment are eliminated in this embodiment. Priority for executing the execution task 6b is lower than a later-descried subtask generated by the transfer task 6d. The execution task 6b will be executed for every block of the print data.

Figure 14:
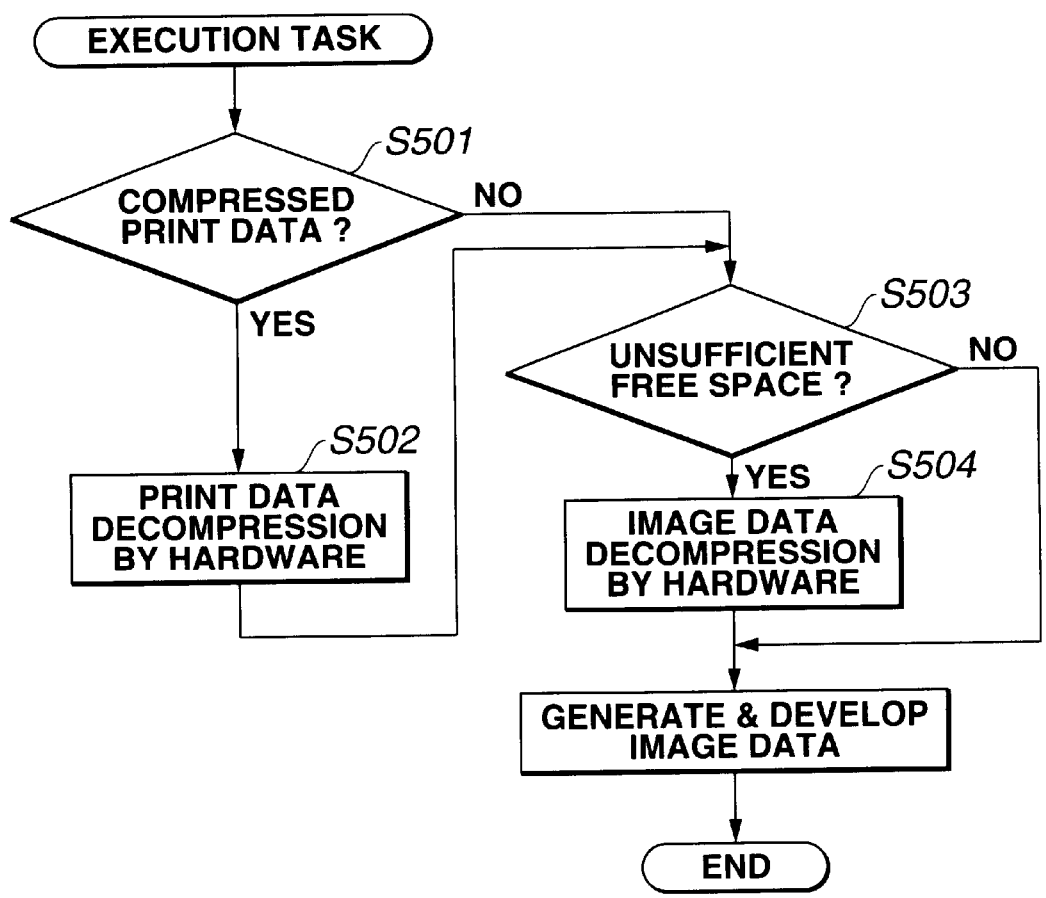
FIG. 14 is a flowchart showing steps of execution task according to the third embodiment of the present invention.

FIG. 14 is a flowchart showing steps of the execution task 6b according to this embodiment.

The CPU 6 accesses the reception buffer 9' in the RAM 9 to discriminate whether the received print data set has been compressed or not (step S501). If the print data set is compressed one, the CPU 6 controls the compressor/decompressor 32 to decompress the compressed print data in the buffer 9' (step S502), and the buffer 9' is refreshed with the decompressed print data set.

After the decompression is competed, or it is discriminated at step S502 that there is no print data to be decompressed, the CPU 6 discriminates whether the image memory 10 has sufficient free area (step S503). In a case where the image memory has the sufficient free area, the process flow jumps to step S505.

On the contrary, in a case where the image memory 10 has insufficient free area, the CPU 6 controls the compressor/decompressor 32 to decompress the image data set previously stored in the image memory 10 (step S504), and the image memory 10 is refreshed with the decompressed image data set. Then, the flow forwards to step S505.

In step S505, the CPU 6 generates image data based on the print data stored in the buffer 9', and develops the generated image data in the image memory 10. After the development of the image data, the CPU 6 terminates the execution task 6b.

Figure 15:
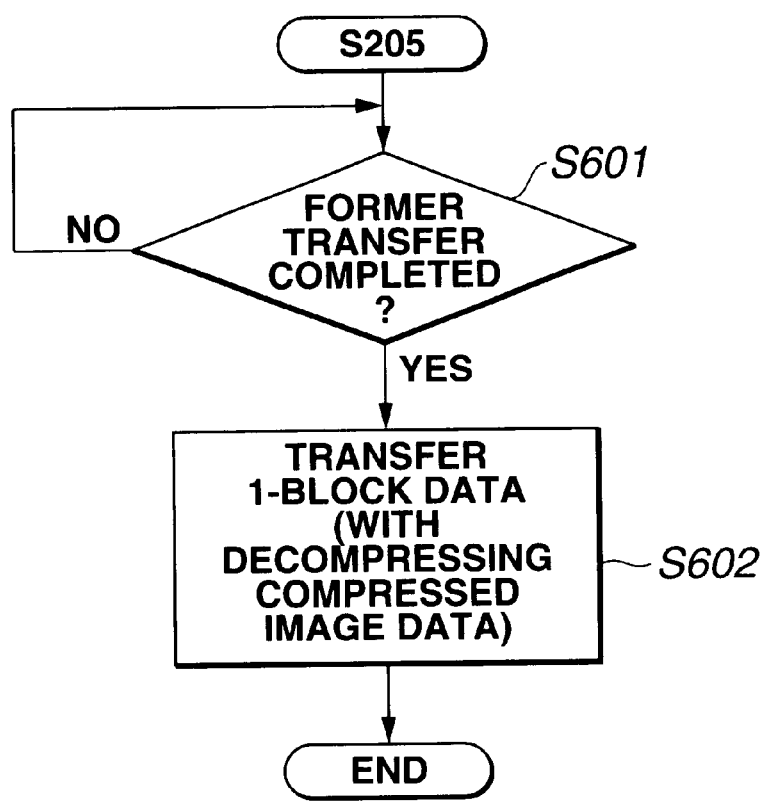
FIG. 15 is a flowchart showing steps of a subtask generated in the transfer task, according to the third embodiment of the present invention.

FIG. 15 is a flowchart showing steps to be executed at step S205 of the transfer task 6d shown in FIG. 6. The process flow shown in FIG. 15 is generated as a subtask of the transfer task 6d. The subtasks are prepared so as to corresponds to the number of the blocks of the image data to be transferred. Each of the subtasks is standing by for its execution until the image data in the corresponding block are transferred while the decompression of the print data for 1 block has been completed. The activated subtasks are executed in accordance with the print queue 7c.

The CPU 6 determines whether the image data transfer for 1 block according to the former subtask has been completed (step S601). If the image data transfer according to the former subtask is still being executed, the CPU 6 waits for its completion by repeatedly performing step S601.

In response to completion of the image data transfer according to the former subtask, the CPU 6 transfers the image data for 1 block corresponding to the former subtask from the image memory 10 to the transfer circuits 11M, 11C, 11Y and 11B (step S602). After the image data transfer according to all subtasks are completed, the flow forwards to step S206.

Figure 16:
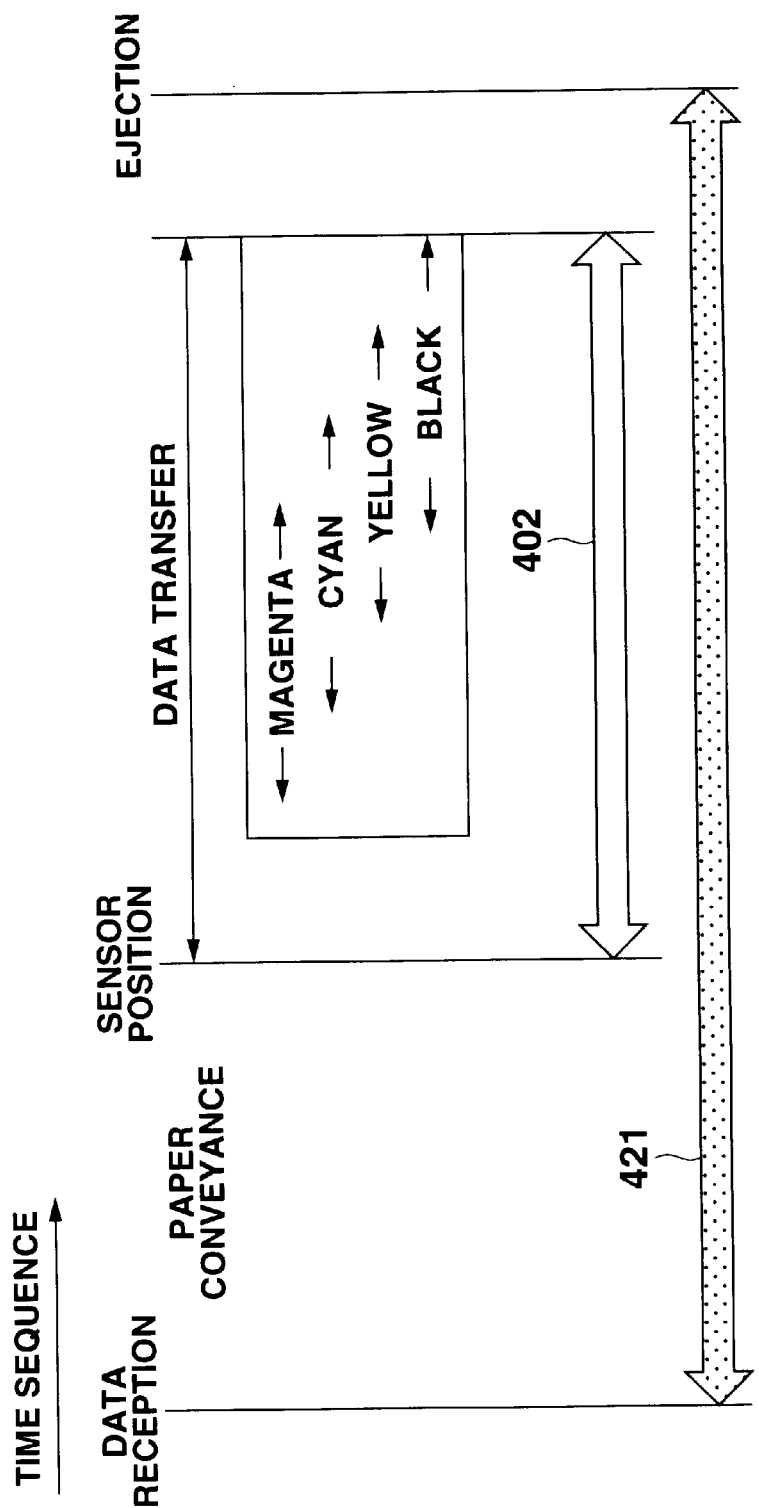
FIG. 16 is a timing chart showing timings where the compressor/decompressor is used for compressing/decompressing the print data and image data.

A period where the compressor/decompressor 32 is available for compressing/decompressing the print data and image data will now be described with reference to a timing chart shown in FIG. 16.

In the printer according to this embodiment, the compressor/decompressor 32 is allowed to decompresses the print data during a period 421 from the print data reception to the paper ejection. During the period 421, the compressor/decompressor 32 also compresses the image data in the image memory 10.

Another period 402 from sensor detection to completion of image data transfer, is included in the period 421. During the period 402, the highest priority is given to the image data transfer according to the subtasks of the transfer task 6d. Therefore, the compressor/decompressor 32 is allowed to perform print data decompression and image data compression during intervals of the image data transfer.

Figure 17:
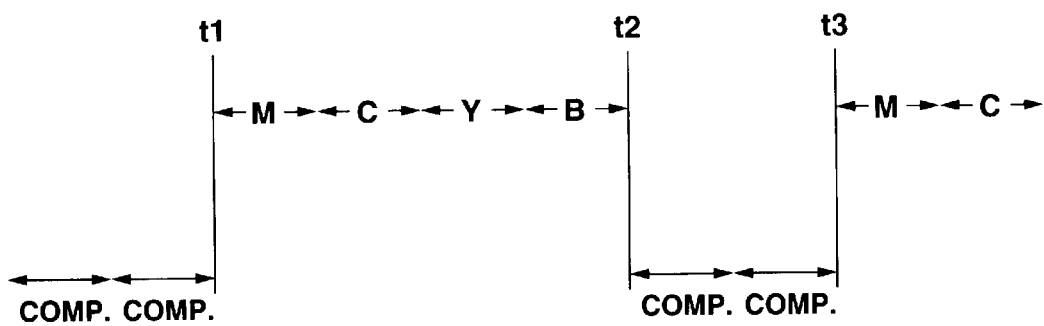
FIG. 17 is a timing chart in case of parallel processing of image data compression and data transfer to transfer circuits, according to the third embodiment of the present invention.

FIG. 17 is a timing chart in case of parallel processing of image data compression and image data transfer. In FIG. 17, alphabets "M", "C", "Y" and "B" denote data transfer (block by block) of image data sets each for magenta (M), cyan (C), yellow (Y) and black (B), from the image memory 10 to the transfer circuits 11M, 11C, 11Y and 11B respectively.

In a case where a subtask of the transfer task 6d is generated at a timing t1 while the compressor/decompressor 32 is compressing the image data in image memory 10, the highest priority is given to processing the subtask after the timing t1. That is, the compressor/decompressor 32 is occupied with decompressing the image data sets to be transferred to the transfer circuits 11M, 11C, 11Y and 11B.

After the processing for the subtask is completed at a timing t2, the compressor/decompressor 32 returns to image data compression. When another subtask of the transfer task 6d is generated at a timing t3, the compressor/decompressor 32 is switched to decompress the image data sets to be transferred to the transfer circuits 11M, 11C, 11Y and 11B.

Figure 18:
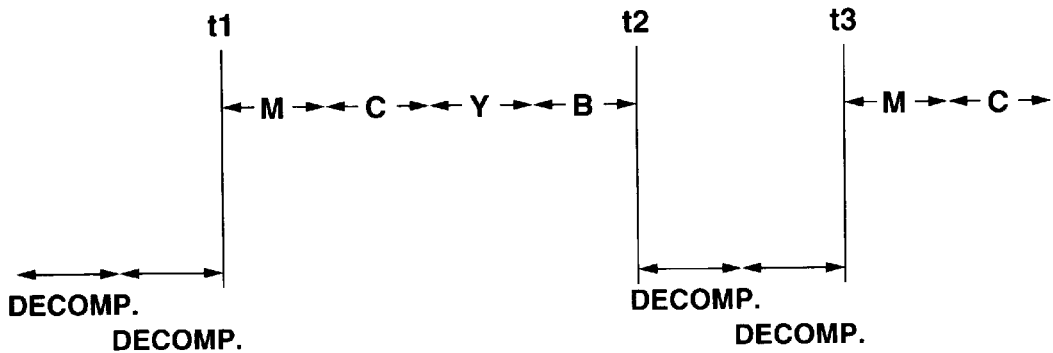
FIG. 18 is a timing chart in case of parallel processing of image data compression and print data decompression, according to the third embodiment of the present invention.

FIG. 18 is a timing chart in case of parallel processing of print data decompression and image data transfer. The reference alphabets are the same as those shown in FIG. 17, that is, "M", "C", "Y" and "B" denote data transfer (block by block) of image data sets each for magenta (M), cyan (C), yellow (Y) and black (B), from the image memory 10 to the transfer circuits 11M, 11C, 11Y and 11B respectively.

In a case where a subtask of the transfer task 6d is generated at a timing t1 while the compressor/decompressor 32 is decompressing the print data supplied from the PC 5, the highest priority is given to processing the subtask after the timing t1. That is, the compressor/decompressor 32 is occupied with decompressing the image data sets to be transferred to the transfer circuits 11M, 11C, 11Y and 11B.

After the processing for the subtask is completed at a timing t2, the compressor/decompressor 32 returns to the print data decompression. When another subtask of the transfer task 6d is generated at a timing t3, the compressor/decompressor 32 is switched to decompressing the image data sets to be transferred to the transfer circuits 11M, 11C, 11Y and 11B.

In the printer according to this embodiment, the compressor/decompressor 32 can perform print data decompression and image data compression during a period from the sensor detection to the completion of the image data transfer. As a result, required time period for the print data decompression and image data compression is reduced, thus, the process time of the printer as a whole will be reduced.

Fourth Embodiment

In the above third embodiment, the PC 5 previously adjusts the size of the print data for 1 block so as to coincide with the size of 1 block in the image memory 10. Such the size adjustment may impede data compression with rich compression rate.

In this embodiment, the PC 5 compresses the print data before supplying it to the printer 1 instead of dividing.

Task switch operations, from the execution task 6b to the transfer task 6d and vice versa, will now be described.

Figure 19A:
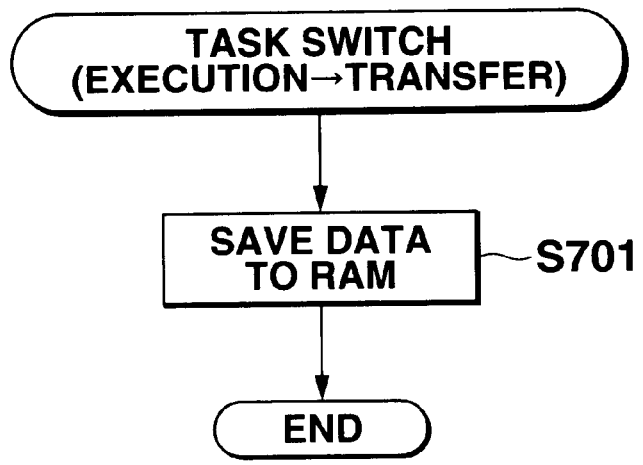
FIG. 19A is a flowchart showing a step of a task executed during switching the execution task to the transfer task, according to a fourth embodiment of the present invention.
Figure 19B:
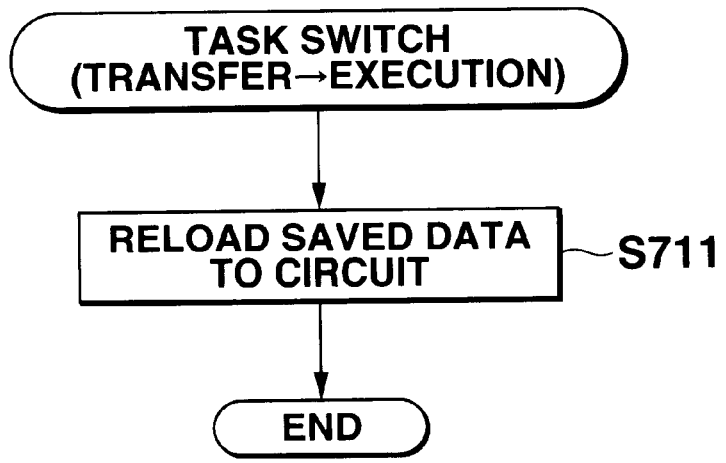
FIG. 19B is a flowchart showing a step of a task executed during switching the transfer task to the execution task, according to the fourth embodiment of the present invention.

The execution and transfer tasks 6b and 6d themselves are substantially the same as those described in the third embodiment. In this embodiment, however, the subtask of the transfer task 6d generated at step S205 is activated merely when the image data transfer of the corresponding block is started. The activated subtask is executed in accordance with the print queue 7c. FIG. 19A is a flowchart showing steps of switching the tasks from the execution task 6b to the transfer task 6d (or its subtask). FIG. 19B is a flowchart showing the steps of switching the tasks from the transfer task 6d (or its subtask) to the execution task 6b.

As shown in FIG. 19A, the switching task is executed before executing the transfer task 6d. Through the switching task, the CPU 6 save the data being processed by the compressor/decompressor 32 in a predetermined area of the RAM 9 (step S701). After the data saving, the switching task is terminated, and execution of the transfer task 6d (or its subtask) follows.

As shown in FIG. 19B, the switching task is executed before executing the execution task 6b. Through the switching task, the CPU 6 restores the saved data in the compressor/decompressor 32 from the RAM 9 (step S711). After the data restoration, the switching task is terminated, and execution of the execution task follows.

Work timings of the compressor/decompressor 32 for compressing/decompressing the print data and image data will now be described with reference to a timing chart shown in FIG. 20A.

Figure 20A:
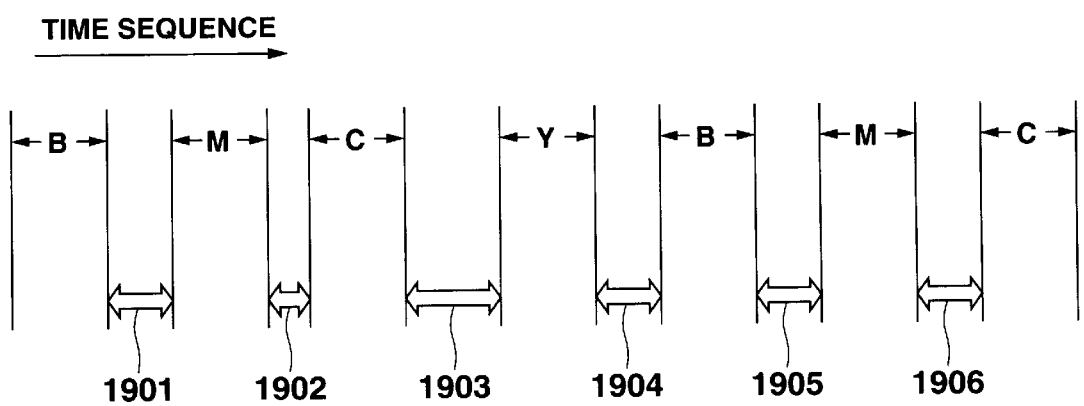
FIG. 20A is a timing chart showing timings where the compressor/decompressor is used for compressing/decompressing the print data and the image data.
Figure 20B:
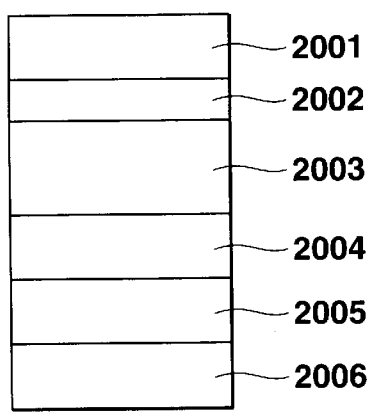
FIG. 20B is a diagram showing a relationship between a period for decompressing the print data shown in FIG. 20A and the print data to be decompressed.

In FIG. 20A, alphabets "M", "C", "Y" and "B" denote periods where the compressor/decompressor 32 is available for decompressing the image data before transferring the image data sets each for magenta (M), cyan (C), yellow (Y) and black (B) to the transfer circuits 11M, 11C, 11Y and 11B respectively. Reference numerals 1901 to 1906 denoted periods among the periods "M", "C", "Y" and "B" where the compressor/decompressor 32 is available for decompressing the print data. Print data sets 2001 to 2006 shown in FIG. 20B are decompressed during the periods 1901 to 1906 respectively.

In the printer according to this embodiment, the compressor/decompressor 32 is available for decompressing the print data and compressing the image data during a period from the sensor detection to the completion of image data transfer. In this case, data dividing by the PC 5 is unnecessary. Thus, the print data to be supplied to the printer 1 from the PC 5 is compressed with rich compression rate.

Modified Embodiment

In the above first to fourth embodiments, the color printers which employs subtractive mixture color printing with four-color toners of magenta (M), cyan (C), yellow (Y) and black (B) have been exemplified for explaining the present invention. The present invention is not limited to those, but is applicable to a color printer utilizing 5 or more color toners, or to a monochrome printer utilizing a single color toner.

In the above first to fourth embodiments, the LED printers have been exemplified for explaining the present invention. The present invention is not limited to those, but is applicable to other type printer such as a laser printer, an ink-jet printer and a thermal printer. Moreover, the present invention is applicable not only to a single purpose printer but also to other device including printing section such as a facsimile machine. In a case where the present invention is applied to the facsimile machine, received data through a telephone line correspond to the print data in the above embodiments. The present invention is applicable to a multi-purpose machine having multiple functions as a printer, a facsimile machine, a copying machine, and the like.

Various embodiments and changes may be made thereunto without departing from the broad spirit and scope of the invention. The above-described embodiments are intended to illustrate the present invention, not to limit the scope of the present invention.

The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H11-94669 filed on Apr. 1, 1999 and including specification, claims, drawings and summary. The disclosure of the above Japanese Patent Application is incorporated herein by reference in its entirety.

What is claimed is:

1. An image forming apparatus including an image forming mechanism for forming an image represented by data supplied from a host device on a recording medium, said image forming apparatus comprising:

a compressor/decompressor which compresses and decompresses data;

a buffer, connected to said compressor/decompressor by a signal line, which stores compressed original data given by a host device in order to generate image data;

an image memory, connected to said compressor/decompressor and said buffer by signal lines, which stores image data or compressed image data to be output;

a transfer circuit which outputs the image data or decompressed image data stored in said image memory via a first way formed by a signal line which connects said transfer circuit directly to said image memory or via a second way formed by a signal line which connects said transfer circuit to said image memory via said compressor/decompressor;

an image forming mechanism which forms an image corresponding to image data supplied by said transfer circuit on a recording medium; and a processor which executes a predetermined program to control data compression/decompression by said compressor/decompressor and data transfer among said compressor/decompressor, said buffer, said image memory, and said transfer circuit, wherein said processor discriminates whether a present period is a period for transferring the image data or the compressed image data stored in said image memory to said image forming mechanism via said transfer circuit, and wherein said processor controls said compressor/decompressor to decompress original data in said buffer when said processor discriminates that the present period is not the period for transferring the image data or the compressed image data to said image forming mechanism.

2. The image forming apparatus according to claim 1, wherein said processor executes a predetermined program to decompress the original data in said buffer when said processor discriminates that the present period is the period for transferring the image data or the compressed image data to said image forming mechanism.

3. The image forming apparatus according to claim 1, wherein said processor further controls compression of uncompressed image data in said image memory.

4. The image forming apparatus according to claim 3, wherein said processor discriminates whether a present period is a period for transferring the image data or compressed image data in said image memory to said image forming mechanism via said transfer circuit, and wherein said processor controls said compressor/decompressor to compress the uncompressed image data in said image memory when said processor discriminates that the present period is not the period for transferring the image data or the compressed image data to said image forming mechanism.

5. The image forming apparatus according to claim 1, wherein said processor controls said compressor/decompressor to decompress the original data when the original data is supplied from said host device, wherein said processor detects whether a time sequence for image forming based on the supplied print data reaches a predetermined timing, and wherein said processor controls said compressor/decompressor to cease decompressing the original data when said processor detects that the time sequence reaches the predetermined timing.

6. The image forming apparatus according to claim 5, wherein the predetermined timing appears before a timing where said record medium reaches a predetermined position by conveyance in the image forming which appears after a maximum time period required for decompressing the original data for 1 block lapses since the predetermined timing.

7. The image forming apparatus according to claim 1, wherein said processor controls said compressor/decompressor to decompress the original data in said buffer when an image data set in a next block is standing by for data transfer, even if said processor discriminates that the present period is the period for transferring the image data or the compressed image data to said image forming mechanism.

8. The image forming apparatus according to claim 7, wherein the size of a block of the original data is equal to the size of a block for the image data.

9. The image forming apparatus according to claim 7, wherein said processor switches said compressor/decompressor to compress the image data after saving the data being processed by said compressor/decompressor when the image data becomes transferable while the original data is being decompressed, and wherein the processor switches said compressor/decompressor to decompress the print data again after restoring the saved data in said compressor/decompressor, when the image data transfer is resting or completed.

10. The image forming apparatus according to claim 3, wherein said processor controls said compressor/decompressor to compress the uncompressed image data in said image memory when an image data set in a next block is standing by for data transfer, even if said processor discriminates that the present period is the period for transferring the image data or the compressed image data to said image forming mechanism.

11. A method of controlling data compression/decompression in an image forming apparatus which includes an image forming mechanism for forming an image represented by data supplied from a host device on a recording medium, said image forming apparatus comprising:

a compressor/decompressor which compresses and decompresses data;

a buffer, connected to said compressor/decompressor by a signal line, which stores compressed original data given by a host device in order to generate image data;

an image memory, connected to said compressor/decompressor and said buffer by signal lines, which stores image data or compressed image data to be output;

a transfer circuit which outputs the image data or decompressed image data stored in said image memory via a first way formed by a signal line which connects said transfer circuit directly to said image memory or via a second way formed by a signal line which connects said transfer circuit to said image memory via said compressor/decompressor;

an image forming mechanism which forms an image corresponding to image data supplied by said transfer circuit on a recording medium; and a processor which executes a predetermined program to control data compression/decompression by said compressor/decompressor and data transfer among said compressor/decompressor, said buffer, said image memory, and said transfer circuit, wherein said processor switches said compress/decompressor to decompress the compressed image data in said image memory or to decompress the compressed original data in said buffer, the method comprising the steps of:

discriminating whether a present period is a period for transferring the image data or the compressed image data in said image memory to said image forming mechanism via said transfer circuit; and controlling said compressor/decompressor to decompress the original data in said buffer when it is discriminated that the present period is not the period for transferring the image data or the compressed image data to said image forming mechanism.

12. The method according to claim 11, further comprising the step of executing a predetermined program to decompress the original data in said buffer when it is discriminated that the present period is the period for transferring the image data or the compressed image data to said image forming mechanism.

13. The method according to claim 11, further comprising the step of controlling said compressor/decompressor to decompress the original data in said buffer when an image data set in a next block is standing by for data transfer, even if it is discriminated that the present period is the period for transferring the image data or the compressed image data to said image forming mechanism.

14. A method of controlling data compression/decompression by said compressor/decompressor in said image forming apparatus according to claim 1, comprising the steps of:

discriminating whether a present period is a period for transferring the image data or compressed image data in said image memory to said image forming mechanism via said transfer circuit; and controlling said compressor/decompressor to compress the uncompressed image data in said image memory when it is discriminated that the present period is not the period for transferring the image data or the compressed image data to said image forming mechanism.

15. A method of controlling data compression/decompression by said compressor/decompressor in said image forming apparatus according to claim 1, comprising the steps of:

controlling said compressor/decompressor to decompress the original data when the original data is supplied from said host device;

detecting whether a time sequence for image forming based on the supplied print data reaches a predetermined timing; and controlling said compressor/decompressor to quit decompressing the original data when said detecting detects that the time sequence reaches the predetermined timining.

* * * * *